US012580425B2

(12) United States Patent
Chung et al.

(10) Patent No.: US 12,580,425 B2
(45) Date of Patent: Mar. 17, 2026

(54) METHOD FOR DETECTING FOREIGN OBJECT AND ELECTRONIC DEVICE

(71) Applicant: SAMSUNG ELECTRONICS CO., LTD., Suwon-si (KR)

(72) Inventors: Hyungkoo Chung, Suwon-si (KR); Dongzo Kim, Suwon-si (KR); Mincheol Ha, Suwon-si (KR); Yusu Kim, Suwon-si (KR); Kihyun Kim, Suwon-si (KR); Yunjeong Noh, Suwon-si (KR); Keyic Son, Suwon-si (KR); Taehyeon Yu, Suwon-si (KR); Kyungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 707 days.

(21) Appl. No.: 18/094,066

(22) Filed: Jan. 6, 2023

(65) Prior Publication Data

US 2023/0179028 A1    Jun. 8, 2023

Related U.S. Application Data

(63) Continuation of application No. PCT/KR2022/019668, filed on Dec. 6, 2022.

(30) Foreign Application Priority Data

Dec. 7, 2021    (KR) ......................... 10-2021-0173461
Mar. 14, 2022    (KR) ......................... 10-2022-0031285

(51) Int. Cl.
*H02J 50/60* (2016.01)
*H02J 50/12* (2016.01)
*H02J 50/80* (2016.01)

(52) U.S. Cl.
CPC .............. *H02J 50/60* (2016.02); *H02J 50/12* (2016.02); *H02J 50/80* (2016.02)

(58) Field of Classification Search
CPC ...................................................... H02J 50/60
(Continued)

(56) References Cited

U.S. PATENT DOCUMENTS 9,553,485 B2    1/2017    Singh et al.
10,439,445 B2    10/2019    Jung et al.
(Continued)

FOREIGN PATENT DOCUMENTS

EP            4228123        8/2023
JP        2015-154159        8/2015
(Continued)

OTHER PUBLICATIONS

Search Report dated Mar. 13, 2023 in International Patent Application No. PCT/KR2022/019668.
(Continued)

*Primary Examiner* — Ahmed H Omar
(74) *Attorney, Agent, or Firm* — Nixon & Vanderhye, P.C.

(57) ABSTRACT

An electronic device capable of transmitting and receiving wireless power may include a wireless power transfer (WPT) coil and a processor configured to be operatively connected to the WPT coil, wherein the processor may perform control to transmit a first ping signal to an external object through the WPT coil, may identify a waveform of a current or voltage measured while or after transmitting the first ping signal, may obtain a Q factor, based on the identified waveform, may control a power transmission operation by determining that the external object is a foreign object or includes the foreign object and is positioned on a center of the WPT coil when the obtained Q factor is less
(Continued)

than a predetermined Q factor, may transmit a second ping signal to the external object through the WPT coil when the obtained Q factor is equal to or greater than the predetermined Q factor, may identify a waveform of a current or voltage while or after transmitting the second ping signal, may identify inductance measured at both ends of the WPT coil, based on the identified waveform, and may control the power transmission operation by determining that the external object is the foreign object or includes the foreign object and is positioned in a surrounding area of the WPT coil, based on the measured inductance.

20 Claims, 20 Drawing Sheets

(58) Field of Classification Search
USPC ........................................................ 320/108
See application file for complete search history.

(56) References Cited

U.S. PATENT DOCUMENTS

| | | | |
|---|---|---|---|
| 11,309,742 | B2 | 4/2022 | Lee et al. |
| 11,418,067 | B2 | 8/2022 | Mehas et al. |
| 11,539,249 | B2 | 12/2022 | Park |
| 2015/0285926 | A1 | 10/2015 | Oettinger |
| 2016/0204964 | A1 | 7/2016 | Takahashi et al. |
| 2019/0052126 | A1 | 2/2019 | Lee et al. |
| 2019/0312468 | A1 | 10/2019 | Kwon et al. |
| 2020/0119595 | A1* | 4/2020 | Nakano ................... H02J 50/12 |
| 2020/0204005 | A1 | 6/2020 | Lee et al. |
| 2020/0343765 | A1 | 10/2020 | Kwon et al. |
| 2021/0167637 | A1 | 6/2021 | Schwartz et al. |
| 2022/0123598 | A1* | 4/2022 | Wu ........................ H02J 50/12 |

FOREIGN PATENT DOCUMENTS

| | | |
|---|---|---|
| JP | 6387222 | 8/2018 |
| KR | 10-2017-0140685 | 12/2017 |
| KR | 10-1812444 | 12/2017 |
| KR | 10-2018-0038205 | 4/2018 |
| KR | 10-2018-0065693 | 6/2018 |
| KR | 10-1955806 | 2/2019 |
| KR | 10-2019-0050301 | 5/2019 |
| KR | 10-2020-0057913 | 5/2020 |
| KR | 10-2021-0000334 | 1/2021 |
| KR | 10-2021-0014712 | 2/2021 |
| KR | 10-2021-0089529 | 7/2021 |
| KR | 10-2021-0092404 | 7/2021 |
| KR | 10-2021-0136954 | 11/2021 |
| KR | 10-2479879 | 3/2022 |
| KR | 10-2023-0084170 | 6/2023 |

OTHER PUBLICATIONS

Written Opinion dated Mar. 13, 2023 in International Patent Application No. PCT/KR2022/019668.

* cited by examiner

Figure 5B:
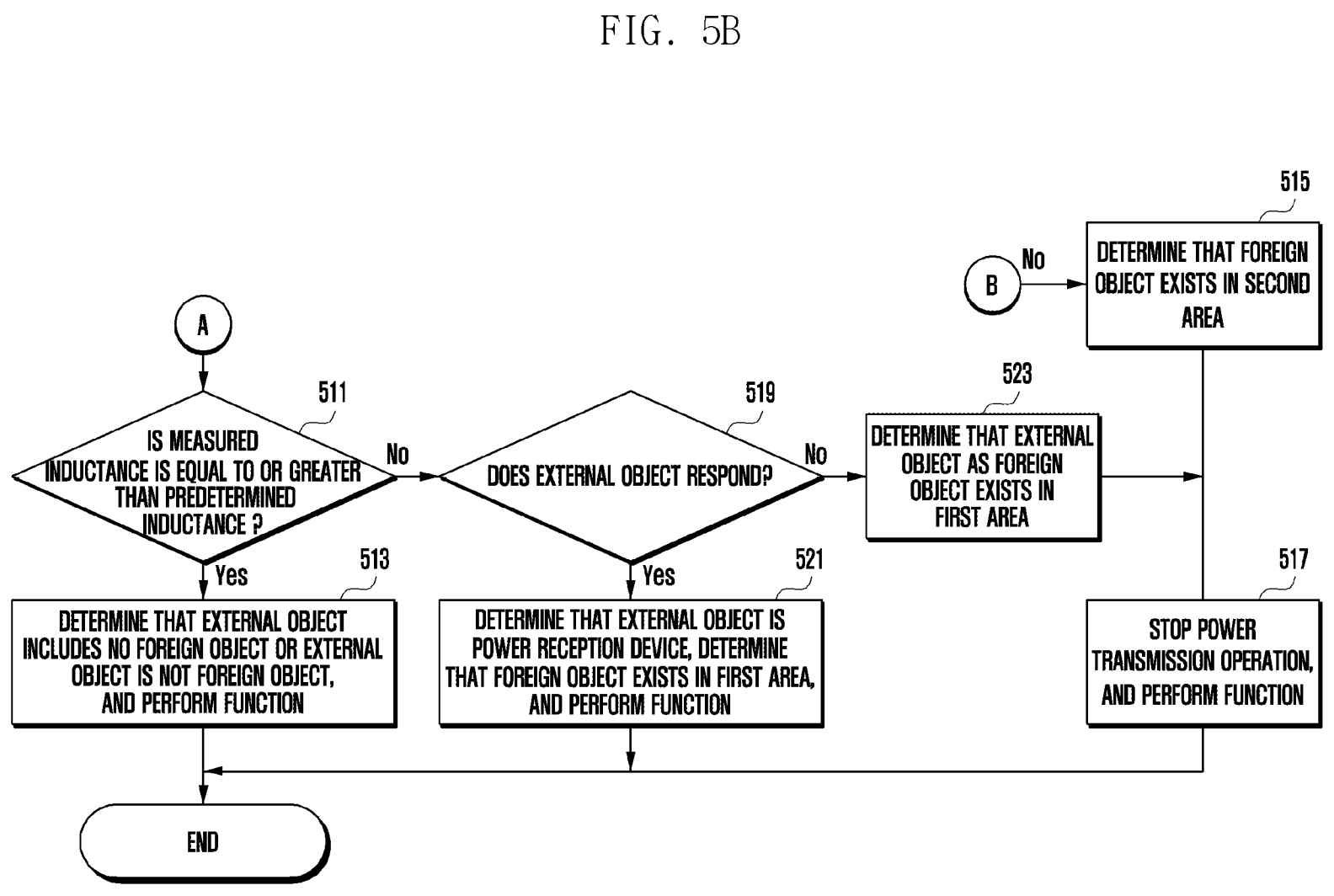

511 IS MEASURED INDUCTANCE IS EQUAL TO OR GREATER THAN PREDETERMINED INDUCTANCE ?

No → 519 DOES EXTERNAL OBJECT RESPOND?

Yes (from 511) → 513 DETERMINE THAT EXTERNAL OBJECT INCLUDES NO FOREIGN OBJECT OR EXTERNAL OBJECT IS NOT FOREIGN OBJECT, AND PERFORM FUNCTION 519 No → 523 DETERMINE THAT EXTERNAL OBJECT AS FOREIGN OBJECT EXISTS IN FIRST AREA 519 Yes → 521 DETERMINE THAT EXTERNAL OBJECT IS POWER RECEPTION DEVICE, DETERMINE THAT FOREIGN OBJECT EXISTS IN FIRST AREA, AND PERFORM FUNCTION

515 DETERMINE THAT FOREIGN OBJECT EXISTS IN SECOND AREA

B → No → 515

517 STOP POWER TRANSMISSION OPERATION, AND PERFORM FUNCTION

END

Figure 7B:
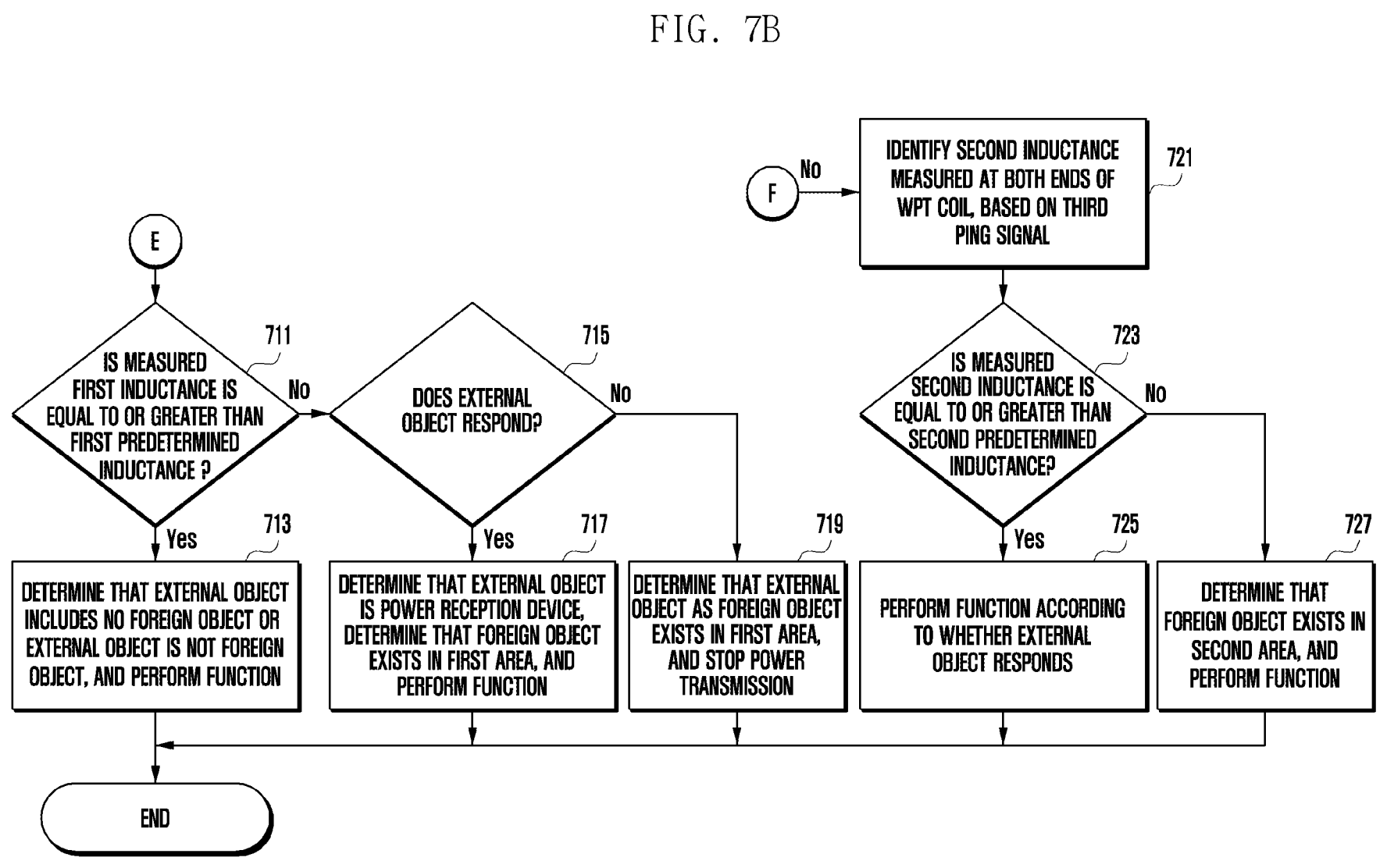

711
IS MEASURED FIRST INDUCTANCE IS EQUAL TO OR GREATER THAN FIRST PREDETERMINED INDUCTANCE ?

No

Yes

713
DETERMINE THAT EXTERNAL OBJECT INCLUDES NO FOREIGN OBJECT OR EXTERNAL OBJECT IS NOT FOREIGN OBJECT, AND PERFORM FUNCTION

715
DOES EXTERNAL OBJECT RESPOND?

No

Yes

717
DETERMINE THAT EXTERNAL OBJECT IS POWER RECEPTION DEVICE, DETERMINE THAT FOREIGN OBJECT EXISTS IN FIRST AREA, AND PERFORM FUNCTION

719
DETERMINE THAT EXTERNAL OBJECT AS FOREIGN OBJECT EXISTS IN FIRST AREA, AND STOP POWER TRANSMISSION

F

No

721
IDENTIFY SECOND INDUCTANCE MEASURED AT BOTH ENDS OF WPT COIL, BASED ON THIRD PING SIGNAL

723
IS MEASURED SECOND INDUCTANCE IS EQUAL TO OR GREATER THAN SECOND PREDETERMINED INDUCTANCE?

No

Yes

725
PERFORM FUNCTION ACCORDING TO WHETHER EXTERNAL OBJECT RESPONDS

727
DETERMINE THAT FOREIGN OBJECT EXISTS IN SECOND AREA, AND PERFORM FUNCTION

END

METHOD FOR DETECTING FOREIGN OBJECT AND ELECTRONIC DEVICE

CROSS-REFERENCE TO RELATED APPLICATIONS

This application is a continuation of International Application No. PCT/KR2022/019668 designating the United States, filed on Dec. 6, 2022 in the Korean Intellectual Property Receiving Office and claiming priority to KR Patent Application No. 10-2021-0173461 filed on Dec. 7, 2021 in the Korean Intellectual Property Office and KR Patent Application No. 10-2022-0031285 filed on Mar. 14, 2022, in the Korean Intellectual Property Office, the disclosures of each of which are incorporated by reference herein in their entireties.

BACKGROUND

Field

The disclosure relates to a method for detecting a foreign object and an electronic device.

Description of Related Art

An electronic device may be charged wirelessly or contactlessly using a wireless power transfer technology. The wireless power transfer technology may be a technique for charging a battery of a power reception device by wirelessly transmitting power from a power transmission device to the power reception device without connecting the power reception device and the power transmission device with a separate connector. The wireless power transfer technology may include a magnetic induction method and a magnetic resonance method, and may additionally include various types of wireless power transfer techniques.

In wireless power transmission and reception between electronic devices, a safety-related accident may occur due to a foreign object interfering with power transmission. However, since a method for detecting a foreign object is determined by an electronic device transmitting external power, safety depends on the performance of the electronic device transmitting wireless power.

SUMMARY

In general, an electronic device may detect the position of a foreign object only when the foreign object is positioned at the center of a power transmission and reception coil. Accordingly, when the foreign object is positioned in an outer area of the power transmission and reception coil, the electronic device may not detect the foreign object. When the foreign object is object is positioned in the outer area of the power transmission and reception coil, power transmission efficiency may be reduced or heat may be generated.

An electronic device capable of receiving wireless power according to an embodiment of the disclosure may provide a method of detecting a foreign object before receiving wireless power.

An electronic device capable of transmitting and receiving wireless power according to various embodiments of the disclosure may include a wireless power transfer (WPT) coil and a processor configured to be operatively connected to the WPT coil, wherein the processor may perform control to transmit a first ping signal to an external object through the WPT coil, may identify a waveform of a current or voltage measured while or after transmitting the first ping signal, may obtain a Q factor, based on the identified waveform, may control a power transmission operation by determining that the external object is a foreign object or includes the foreign object and is positioned on a center of the WPT coil when the obtained Q factor is less than a predetermined Q factor, may transmit a second ping signal to the external object through the WPT coil when the obtained Q factor is equal to or greater than the predetermined Q factor, may identify a waveform of a current or voltage while or after transmitting the second ping signal, may identify inductance measured at both ends of the WPT coil, based on the identified waveform, and may control the power transmission operation by determining that the external object is the foreign object or includes the foreign object and is positioned in a surrounding area of the WPT coil, based on the measured inductance.

An electronic device capable of transmitting and receiving wireless power according to various embodiments of the disclosure may include a wireless power transfer (WPT) coil and a processor configured to be operatively connected to the WPT coil, wherein the processor may transmit a first ping signal to an external object through the WPT coil, may identify a waveform of a current or voltage while or after transmitting the first ping signal, may obtain a Q factor, based on the identified waveform, may measure inductance at both ends of the WPT coil, based on the identified waveform, and may control a power transmission operation by determining that the external object is a foreign object or includes the foreign object and is positioned in a surrounding area of the WPT coil when the obtained Q factor is equal to or greater than a predetermined Q factor and the measured inductance is less than a predetermined inductance.

A foreign object detection method of an electronic device capable of transmitting and receiving wireless power using a wireless power transfer (WPT) coil according to various embodiments of the disclosure may include: transmitting a first ping signal to an external object through the WPT coil; identifying a waveform of a current or voltage measured while or after transmitting the first ping signal; obtaining a Q factor, based on the identified waveform; controlling a power transmission operation by determining that the external object is a foreign object or includes the foreign object and is positioned on a center of the WPT coil when the obtained Q factor is less than a predetermined Q factor; transmitting a second ping signal to the external object through the WPT coil when the obtained Q factor is equal to or greater than the predetermined Q factor; identifying a waveform of a current or voltage while or after transmitting the second ping signal; identifying inductance measured at both ends of the WPT coil, based on the identified waveform; and controlling the power transmission operation by determining that the external object is the foreign object or includes the foreign object and is positioned in a surrounding area of the WPT coil, based on the measured inductance.

A foreign object detection method of an electronic device capable of transmitting and receiving wireless power using a wireless power transfer (WPT) coil according to various embodiments of the disclosure may include: transmitting a first ping signal to an external object through the WPT coil; identifying a waveform of a current or voltage while or after transmitting the first ping signal; obtaining a Q factor, based on the identified waveform; measuring inductance at both ends of the WPT coil, based on the identified waveform; and controlling a power transmission operation by determining that the external object is a foreign object or includes the foreign object and is positioned in a surrounding area of the WPT coil when the obtained Q factor is equal to or greater than a predetermined Q factor and the measured inductance is less than a predetermined inductance.

A foreign object detection method and an electronic device according to an embodiment of the disclosure may detect a foreign object regardless of the position of the foreign object, thereby reducing or preventing safety-related accidents that may occur due to a foreign object during wireless power transmission and reception.

BRIEF DESCRIPTION OF THE DRAWINGS

In describing the drawings, the same or like reference numerals may be used to refer to the same or like elements.

The above and other aspects, features and advantages of certain embodiments of the present disclosure will be more apparent from the following detailed description, taken in conjunction with the accompanying drawings, in which:

FIG. 3A is a block diagram schematically illustrating an example power reception device according to various embodiments;

FIG. 5A and FIG. 5B are flowcharts illustrating an example foreign object detection method of an example electronic device according to various embodiments;

FIG. 7A and FIG. 7B are flowcharts illustrating an example foreign object detection method of an example electronic device according to various embodiments;

FIG. 10 is a graph illustrating a Q factor measured according to existence and position of a foreign object according to various embodiments;

FIG. 11 is a graph illustrating coupling inductance measured according to existence and position of a foreign object according to various embodiments; and FIG. 12 is a graph illustrating coupling inductance measured according to existence and position of a foreign object according to various embodiments.

DETAILED DESCRIPTION

Figure 1:
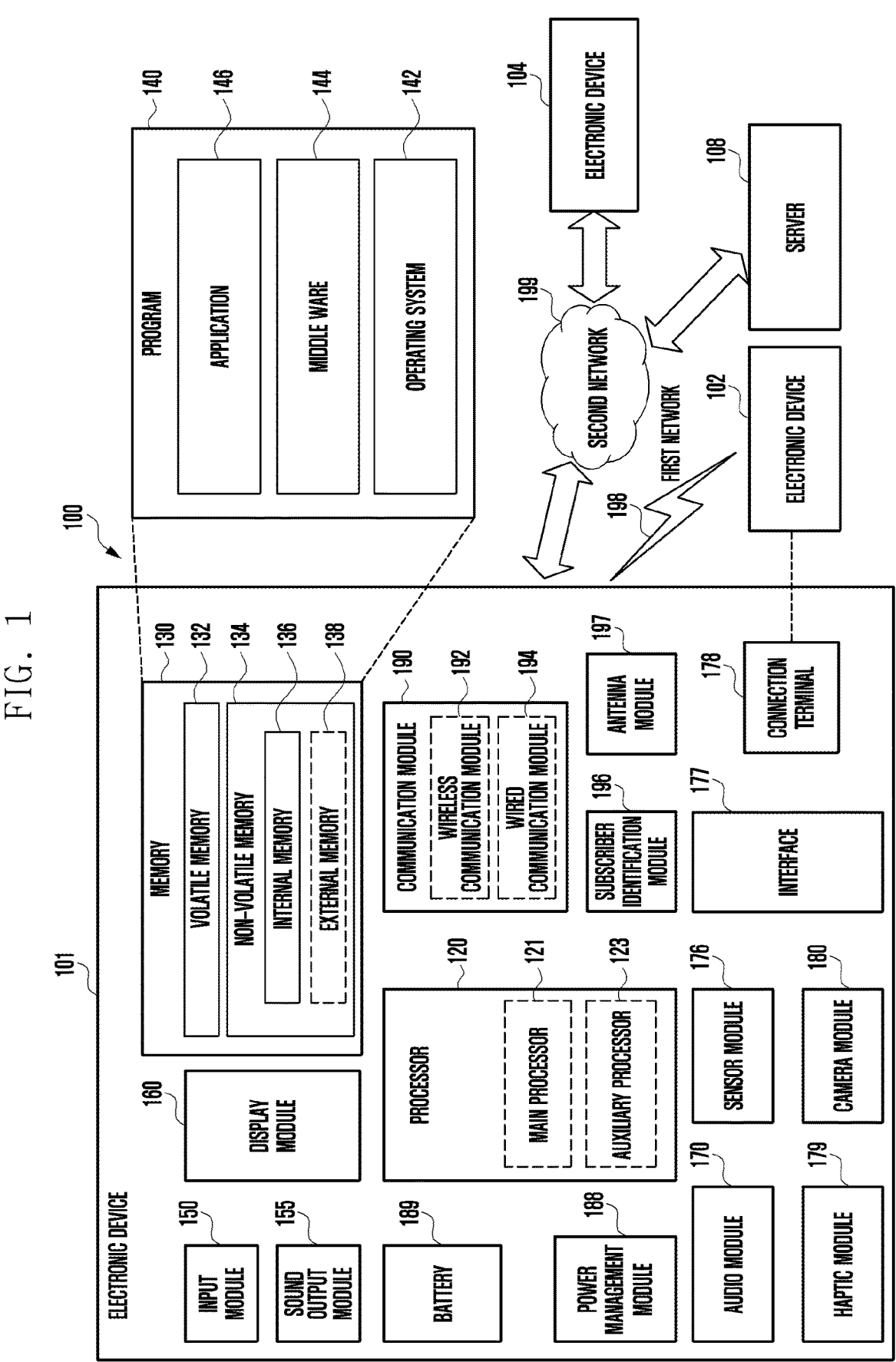
FIG. 1 is a block diagram of an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199

(e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
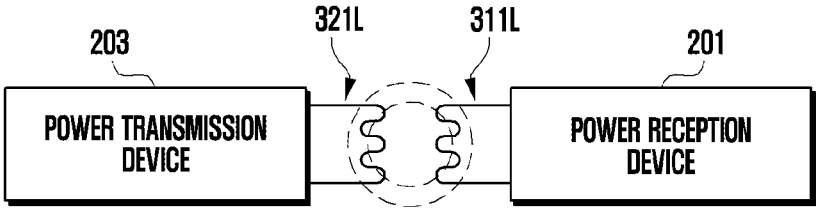
FIG. 2 schematically illustrates an example operation of transmitting and receiving power between an example power reception device and an example power transmission device according to various embodiments.

FIG. 2 schematically illustrates an example operation of transmitting and receiving power between a power reception device 201 and a power transmission device 203 according to various embodiments.

The power reception device 201 and the power transmission device 203 may include the same components as those of the electronic device 101 of FIG. 1.

For example, the electronic device 101 may include at least one of the power reception device 201 and/or the power transmission device 203.

In an embodiment, the power transmission device 203 may transmit power to the power reception device using a magnetic induction phenomenon in which a current is induced in a reception coil 311L by changing a magnetic field of a transmission coil 321L.

In various embodiments, the power reception device 201 and the power transmission device 203 may support at least one wireless charging method among a magnetic induction method, a magnetic resonance method, and/or an electromagnetic wave method.

In an embodiment, one power transmission device 203 may charge a plurality of power reception devices 201.

In various embodiments, a plurality of power transmission devices 203 may charge at least one power reception device 201.

Figure 3A:
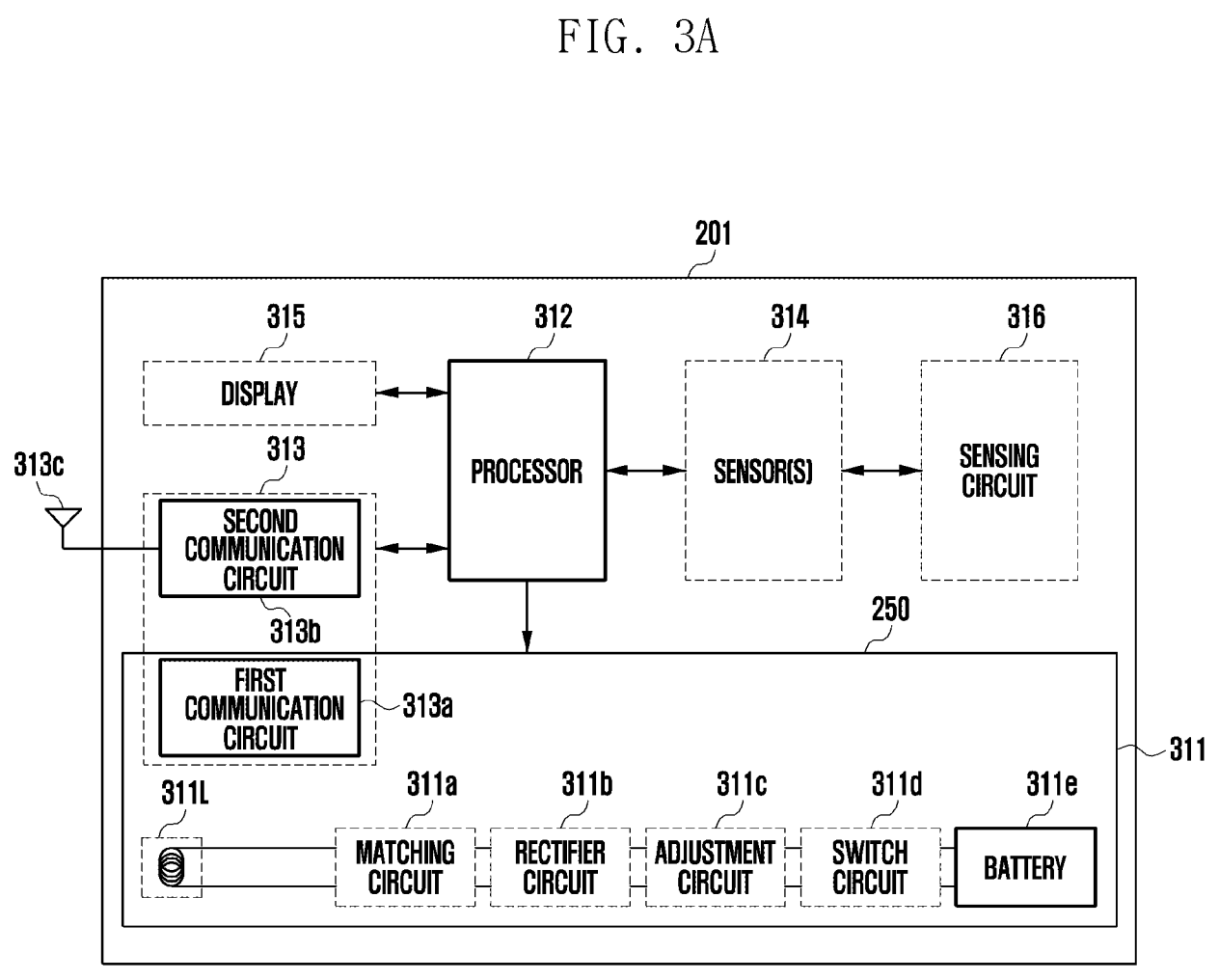

FIG. 3A is a block diagram schematically illustrating an example power reception device 201 according to various embodiments.

Figure 3B:
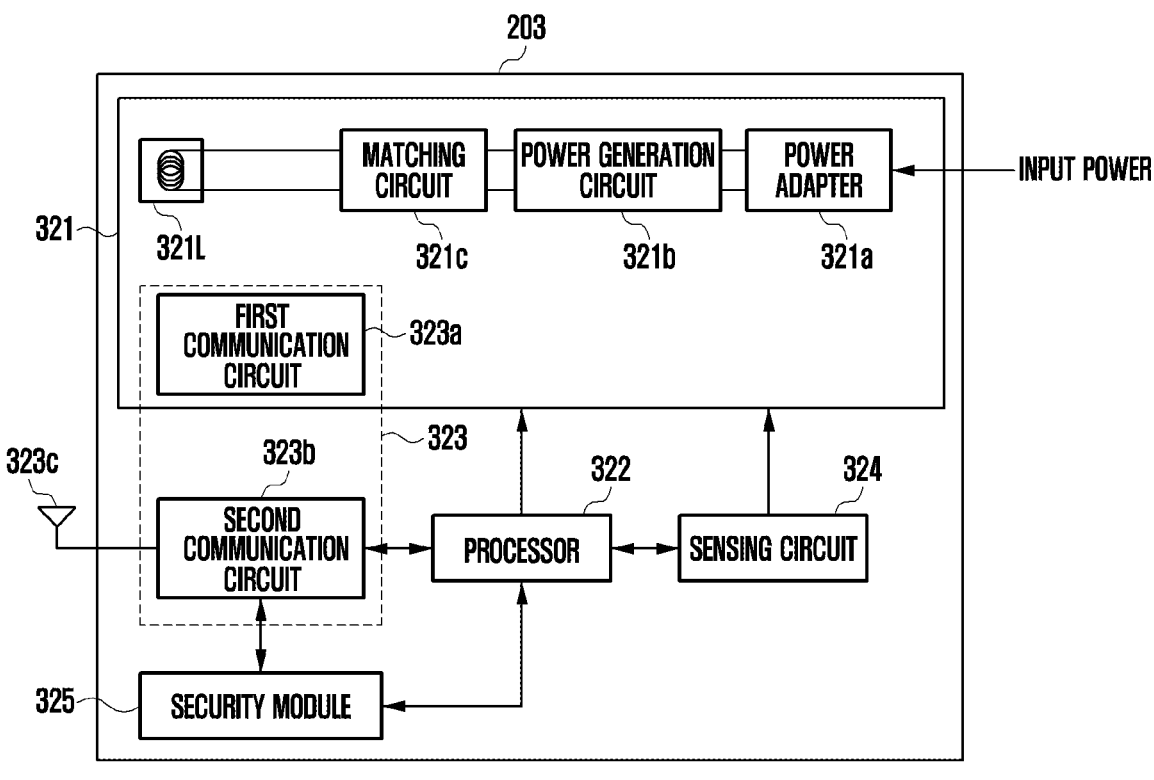
FIG. 3B is a block diagram schematically illustrating an example power transmission device according to various embodiments.

FIG. 3B is a block diagram schematically illustrating an example power transmission device 203 according to various embodiments.

According to an embodiment, referring to FIG. 3A and FIG. 3B, the power transmission device 203 may wirelessly supply power to the power reception device 201, and the power reception device (e.g., the electronic device 101 of FIG. 1) may wirelessly receive power. Roles of the power reception device 201 and the power transmission device 203 in a wireless charging function are not limited to FIG. 3A and FIG. 3B, and may be applied in an opposite manner. For example, a smartphone or a wearable device may serve as the power reception device 201, and a smartphone may serve as the power transmission device 203.

According to an embodiment, the power reception device 201 may include a power reception circuit 311, a processor 312 (e.g., the processor 120 of FIG. 1), a communication circuit 313 (e.g., the communication module 190 of FIG. 1), a sensor(s) 314 (e.g., the sensor module 176 of FIG. 1), a display 315 (e.g., the display module 160 of FIG. 1), and/or a sensing circuit 316.

According to an embodiment, the power reception circuit 311 may include a reception coil 311L to wirelessly receive power from the power transmission device 203, a matching circuit 311a to increase efficiency between a transmission coil 321L and the reception coil 311L through impedance matching, a rectifier circuit 311b to rectify received AC power into DC power, an adjustment circuit 311c to adjust a charging voltage, a switch circuit 311d, and/or a battery 311e (e.g., the battery 189 of FIG. 1). For example, the power reception circuit 311 may be included in a receiver integrated circuit (RxIC).

According to an embodiment, the communication circuit 313 may include at least one of a first communication circuit 313a and a second communication circuit 313b. The first communication circuit 313a may communicate with the power transmission device 203 through the reception coil 311L. The second communication circuit 313b may communicate with the power transmission device 203 using at least one of various short-range communication methods, such as Bluetooth, Bluetooth Low Energy (BLE), Wi-Fi, Wi-Fi Direct, or near-field communication (NFC). The second communication circuit 313b may include an antenna 313c for communicating with an external electronic device (e.g., a different electronic device). For example, the communication circuit 313 may be included in the receiver integrated circuit (RxIC).

According to an embodiment, the first communication circuit 313a may communicate with a first communication circuit 323a of the power transmission device 203, for example, using a frequency band the same as or contiguous to that of a power signal frequency in the coil 311L (e.g., an in-band method). For example, in various embodiments, the first communication circuit 323a of the power transmission device 203 and the first communication circuit 313a of the power reception device 201 may communicate by the in-band method. The first communication circuit 313a of the power reception device 201 may communicate with the power transmission device 203 using the reception coil 311L for receiving power from the power transmission device 203. The power reception device 201 and the power transmission device 203 may communicate using the coils 311L and 321L for power transmission and reception.

The coils 311L and 321L of FIG. 2, FIG. 3A, and FIG. 3B may be wireless power transfer (WPT) coils.

According to an embodiment, when the power reception device 201 receives a signal or power transmitted from the power transmission device 203 through the coil 311L, the power reception device 201 may control the communication circuit 313 to generate device information or power information about the power reception device 201 to be transmitted to the power transmission device 203. The generated power information may be transmitted to the power transmission device 203 through the coil 311L. Alternatively, the generated power information may be transmitted to the power transmission device 203 through a separate antenna (e.g., the antenna 313c). For example, the power information may be information (e.g., reception power, voltage, or a current state) related to charging power of the power reception device 201, or may include output power of the power transmission device 203, output voltage information, charging current information, or information related thereto. For example, the power information may include information for requesting a change of transmission power of the power transmission device 203.

According to an embodiment, the power reception device 201 may charge the battery 311e through a charging circuit using power received from the power transmission device 203 through the power reception circuit 311. When a magnetic field is formed in a coil (e.g., the transmission coil (Tx coil) 321L) of the power transmission device 203, a current flows in a coil (e.g., the reception coil (Rx coil) 311L) of the power reception device 201 by electromagnetic induction or resonance, and the battery 311e may be charged through the charging circuit using the current.

According to an embodiment, the sensing circuit 316 may detect that the power reception device 201 is detached from the power transmission device 203. For example, the sensing circuit 316 may include at least one of a hardware detachment sensing circuit and a software detachment sensing algorithm. For example, even though a detachment sensing circuit is not included at the time of manufacture, the power reception device 201 may utilize the sensing circuit 316 by updating a detachment sensing function through a software update.

According to an embodiment, the sensing circuit 316 may detect the power transmission device 203 by detecting a discovery signal or power received from the power transmission device 203. The sensing circuit 316 may detect a signal change in an input/output terminal of the coil 311L, the matching circuit 311a, or the rectifier circuit 311b by a signal of the coil 311L generated by a signal output from the power transmission device 203. The sensing circuit 316 may obtain information about a movement of the power reception device 201. The sensing circuit 316 may obtain information about temperature from at least one sensor 314 (e.g., a temperature sensor or a heart rate monitor (HRM) sensor). For example, the sensing circuit 316 may be included in the receiver integrated circuit (RxIC).

According to an embodiment, the display 315 may display various pieces of display information required for wireless power transmission and reception.

According to an embodiment, the sensor(s) 314 may include at least some of a current/voltage sensor, a temperature sensor, an illuminance sensor, or a sound sensor. The temperature sensor may measure the temperature of the battery 311e.

According to an embodiment, the processor 312 may determine the charging control, based on a time-dependent change in the temperature of the inside of the power reception device 201 or the battery 311e measured by the temperature sensor.

According to an embodiment, the processor 312 may perform overall control of the power reception device 201, may generate various messages required for wireless power transmission, and may transmit the messages to the communication circuit 313.

According to an embodiment, the processor 312 may control charging of the battery 311e through the charging circuit using power received from the power transmission device 203 through the power reception circuit 311. The processor 312 may identify state information related to an operation of charging the battery 311e while charging the battery 311e. For example, the state information related to the operation of charging the battery 311e may include at least one of information related to a fully-charged state of the battery 311e based on the capacity of the battery 311e, information related to whether the battery 311e is abnormal, for example, a swelling state, or a heat generation state of the power reception device 201.

According to an embodiment, the processor 312 may transmit a signal corresponding to stoppage of power output to the power transmission device 203 such that the power transmission device 203 stops an operation of wirelessly outputting power, at least based on the state information related to the operation of charging the battery 311e. For example, when determining at least one state of a state in which the power reception device 201 has a specified temperature or higher or a fully-charged state of the power reception device 201, the processor 312 may perform control to transmit the signal corresponding to the stoppage of power output to the power transmission device 203 such that the power transmission device 203 stops the operation of wirelessly outputting power.

According to an embodiment, the processor 312 may control the power reception circuit 311 not to receive power wirelessly output by the power transmission device 203 or may control at least some (e.g., the communication circuit 313 or the power reception circuit 311) of internal components of the power reception device 201 not to respond to a signal received from the power transmission device 203. For 5 example, the processor 312 may be included in the receiver integrated circuit (RxIC).

According to an embodiment, the processor 312 may identify whether at least one of a signal for resuming charging in a state in which the power output of the power transmission device 203 is stopped or a signal related to a detached state of the power transmission device 203 is detected. For example, when the remaining amount of the battery 311e measured after a lapse of a predetermined time in the fully charged state of the battery 311e is less than a predefined value or when the temperature of the battery 311e is less than a predefined value, the processor 312 may determine that the signal for resuming the charging has been detected. However, the disclosure is not limited in this respect.

According to an embodiment, the processor 312 may identify whether the power reception device is in a state of being adjacently positioned to receive power from the power transmission device 203 (e.g., may receive the signal (e.g., ping) related to the detached state) in the state in which the power output of the power transmission device 203 is stopped, may identify a charging resuming condition of the battery 311e, and may control the battery 311e to be changed through the charging circuit when the charging resuming condition is satisfied (e.g., when the remaining amount of the battery 311e measured after the lapse of the predetermined time is less than the predefined value or when the temperature of the battery 311e is less than the predefined value).

According to an embodiment, the processor 312 may transmit a signal corresponding to resumption of power output to the power transmission device 203 such that the power transmission device 203 resumes the operation of wirelessly outputting power, based on at least one of the signal for resuming charging the battery 311e or a signal related to the detected state of the power reception device 201 from the power transmission device 203. In an embodiment, the processor 312 may receive power transmitted from the power transmission device 203, based on transmitting the signal corresponding to the resumption of power output.

According to an embodiment, the processor 312 may perform control to respond to a signal or power of the power transmission device 203 such that the power transmission device 203 resumes the operation of wirelessly outputting power, based on at least one of the signal for resuming charging the battery 311e or whether the power reception device 201 is detached from the power transmission device 203.

According to an embodiment, when detecting detachment of the power transmission device 203 through the sensing circuit 316, the processor 312 may receive a signal relating to the state of the sensing circuit 316 from the power reception circuit 311. For example, the signal relating to the state of the sensing circuit 316 may include a signal indicating that the sensing circuit 316 switches from a low state (e.g., an attached state) to a high state (e.g., a detached state).

According to an embodiment, the processor 312 may transmit a signal corresponding to deactivation of the power reception circuit 311 to the power reception circuit 311, at least based on the state information related to the operation of charging the battery 311e. Alternatively, an operation of deactivating the power reception circuit 311 may include an operation of controlling a response signal to an identification signal for identifying the power reception device 201 received from the power transmission device 203 not to be transmitted to the power transmission device 203.

According to an embodiment, the processor 312 may transmit a signal corresponding to activation of the power reception circuit 311 to the power reception circuit 311, at least based on the signal for resuming charging the battery 311e or the signal related to the attached state of the power transmission device 203.

Alternatively, an operation of activating the power reception circuit 311 may include an operation of transmitting a response signal to a power signal received from the power transmission device 203 to the power transmission device 203.

Referring to FIG. 3B, the power transmission device 203 may include a power transmission circuit 321, a processor 322, a communication circuit 323, a sensing circuit 324, and/or a security module 325.

According to an embodiment, the power transmission circuit 321 may include a power adapter 321a to receive power (or electricity) from the outside and to appropriately convert the voltage of input power, a power generation circuit 321b to generate power, and/or a matching circuit 321c to increase efficiency between the transmission coil 321L and the reception coil 311L.

According to an embodiment, the power transmission circuit 321 may include a plurality of pieces of at least some of the power adapter 321a, the power generation circuit 321b, the transmission coil 321L, or the matching circuit 321c to transmit power to a plurality of power reception devices.

According to an embodiment, the power transmission circuit 321 may generate a first signal of a first frequency for providing first power to the power reception device 201 and a second signal of a second frequency for providing second power to the power transmission device 203 using the power generation circuit 321b.

According to an embodiment, the processor 322 may perform overall control of the power transmission device 203, and may generate various messages required for wireless power transmission, and may transmit the messages to the communication circuit 323.

According to an embodiment, the processor 322 may calculate power (or amount of power) to be transmitted to the power reception device 201, based on information received from the communication circuit 323.

According to an embodiment, the processor 322 may control the power transmission circuit 321 so that power calculated based on information received through the transmission coil 321L is transmitted to the power reception device 201.

According to an embodiment, when transmitting power to each of the plurality of power reception devices, the processor 322 may control the power generation circuit 321b to generate a first signal of a first frequency for providing first power to a first external electronic device and a second signal of a second frequency for providing second power to a second external electronic device.

According to an embodiment, the communication circuit 323 may include at least one of a first communication circuit 323a and a second communication circuit 323b. The first communication circuit 323a may communicate with the first communication circuit 313a of the power reception device 201, for example, using a frequency band the same as or contiguous to that of a frequency used in the transmission coil 321L for power transmission (e.g., the in-band method). The first communication circuit 313a may communicate, for example, using the transmission coil 321L for transmitting power generated by the power generation circuit 321b to the power reception device 201.

According to various embodiments, the first communication circuit 323a of the power transmission device 203 and the first communication circuit 313a of the power reception device 201 may communicate by the in-band method. The first communication circuit 323a of the power transmission device 203 may communicate with the power reception device 201 using the transmission coil 321L for transmitting power to the power reception device 201. The first communication circuit 313a of the power reception device 201 may communicate with the power transmission device 203 using the reception coil 311L for receiving power from the power transmission device 203. The power reception device 201 and the power transmission device 203 may communicate using the coils 311L and 321L for power transmission and reception.

According to an embodiment, the second communication circuit 323b may communicate with the second communication circuit 313b of the power reception device 201, for example, using a frequency band different from that of the frequency used in the transmission coil 321L for power transmission (e.g., an out-band method). For example, the second communication circuit 323b may use at least one of various short-range communication methods, such as Bluetooth, Bluetooth Low Energy (BLE), Wi-Fi, Wi-Fi Direct, or near-field communication (NFC). The second communication circuit 323b may include an antenna 323c for communicating with an external electronic device (e.g., the power reception device 201). The processor 322 may obtain information related to a charging state (e.g., Vrec information, Iout information, various packets, and/or messages) from the communication circuit 323, 323a, or 323b. The processor 322 may adjust power supplied to the power reception device 201, based on the information related to the charging state.

According to an embodiment, the security module 325 may encode data to be transmitted when transmitting the data through the second communication circuit 323b.

According to an embodiment, the security module 325 may be used for data encoding when transmitting data through the second communication circuit 323b.

According to an embodiment, the security module 325 may be connected to the processor 322 and/or the second communication circuit 323b to transmit and receive data. The security module 325 may perform an authentication procedure or may utilize data stored in the security module 325 while transmitting and receiving the data to and from the processor 322 and/or the second communication circuit 323b.

According to an embodiment, the security module 325 may be included in the processor 322 to be configured as an integrated circuit.

According to an embodiment, the processor 322 may encode data when transmitting the data through the second communication circuit 323b.

According to an embodiment, the processor 322 may be connected to the second communication circuit 323b to transmit and receive data. The processor 322 may perform an authentication procedure or may utilize data stored in the security module 325 while transmitting and receiving the data to and from the second communication circuit 323b.

The power transmission device 203 may further include a policy manager (not shown) relating to a communication method of the second communication circuit 323b or a charging policy.

In an embodiment, the policy manager may identify the power state (e.g., voltage, current, and/or power) of the power reception device 201 communicatively connected through the first communication circuit 323a or the second communication circuit 323b, and may change the power state for charging when authentication of the power reception device 201 is completed.

In an embodiment, the processor 322 may identify the power state (e.g., voltage, current, and/or power) of the power reception device 201 communicatively connected through the first communication circuit 323a or the second communication circuit 323b, and may change the power state for charging when authentication of the power reception device 201 is completed.

According to an embodiment, the sensing circuit 324 may include at least sensor, and may detect at least one state of the power transmission device 203 using the at least sensor.

According to an embodiment, the sensing circuit 324 may include at least one of a temperature sensor, a motion sensor, and a current (or voltage) sensor, may detect a temperature state of the power transmission device 203 using the temperature sensor, may detect a movement state of the power transmission device 203 using the motion sensor, and may detect the state, for example, the current level, the voltage level, or the power level, of an output signal of the power transmission device 203 using the current (or voltage) sensor.

According to an embodiment, the current (or voltage) sensor may measure a signal in the power transmission circuit 321. The current (or voltage) sensor may measure a signal in at least a portion of the coil 321L, the matching circuit 321c, or the power generation circuit 321b. For example, the current (or voltage) sensor may include a circuit to measure a signal at the front end of the coil 321L.

According to an embodiment, the power transmission circuit 321 may be a circuit for foreign object detection (FOD).

According to various embodiments, the sensing circuit 324 may be a circuit for foreign object detection (FOD).

According to an embodiment, the processor 322 may control transmitting of power for charging the battery 311e of the power reception device 201 to the power reception device 201.

According to an embodiment, when receiving a signal corresponding to stoppage of power output to stop an operation of wirelessly outputting power from the power reception device 201, at least based on the state information related to the operation of charging the battery 311e, the processor 322 may stop an operation of outputting power.

According to an embodiment, the processor 322 may receive a signal corresponding to resumption of power output to resume an operation of wirelessly outputting power from the power reception device 201. In response to receiving the signal corresponding to the resumption of power output, the processor 322 may perform control to wirelessly output power and to transmit the power to the power reception device 201.

Figure 4A:
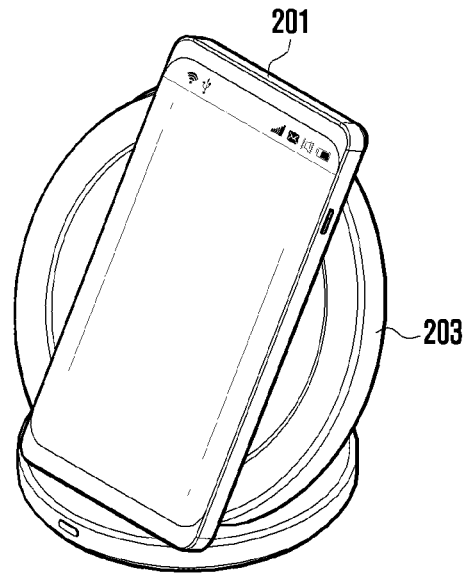
FIG. 4A illustrates an example wireless charging operation between an example power reception device and an example power transmission device according to various embodiments.

FIG. 4A illustrates an example wireless charging operation between a power reception device 201 and a power transmission device 203 according to various embodiments.

Figure 4B:
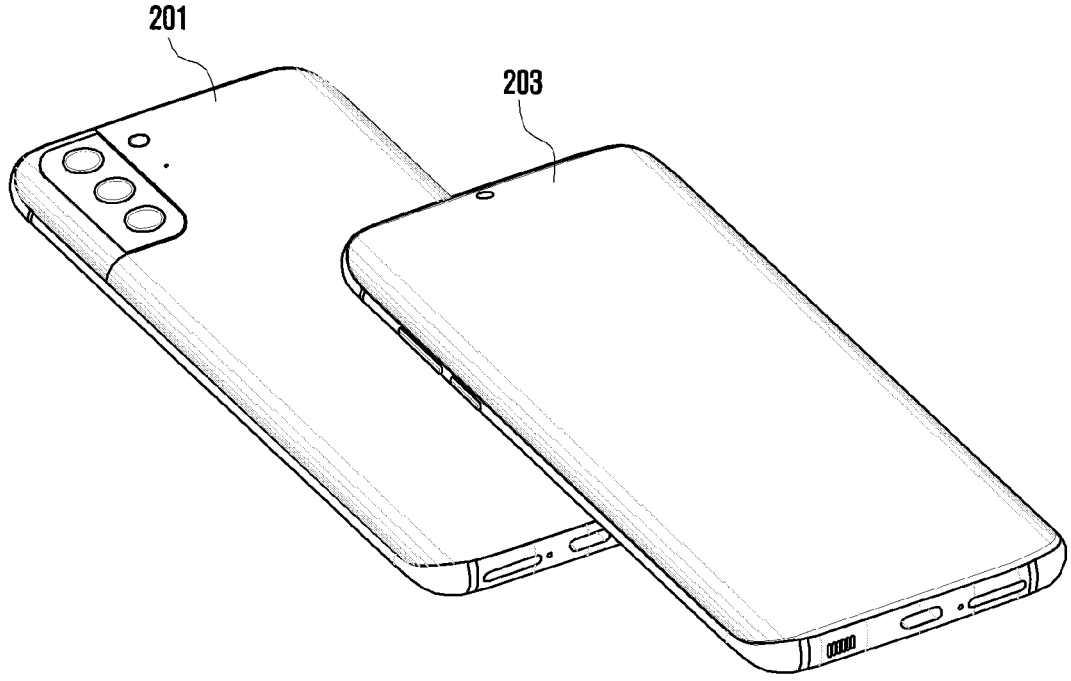
FIG. 4B illustrates an example wireless charging operation between an example power reception device and an example power transmission device according to various embodiments.

FIG. 4B illustrates an example wireless charging operation between a power reception device 201 and a power transmission device 203 according to various embodiments.

Figure 4C:
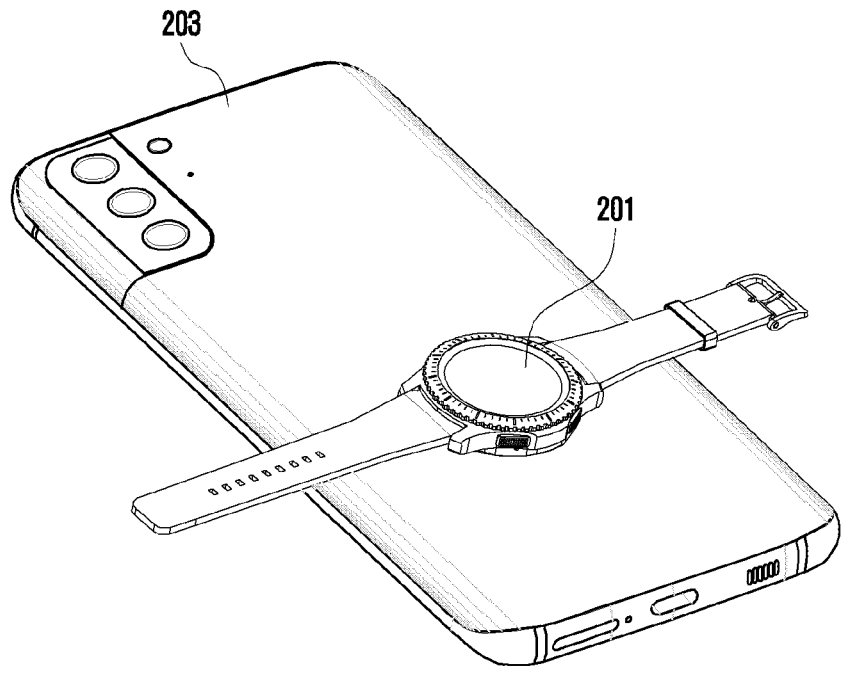
FIG. 4C illustrates an example wireless charging operation between an example power reception device and an example power transmission device according to various embodiments.

FIG. 4C illustrates an example wireless charging operation between a power reception device 201 and a power transmission device 203 according to various embodiments. The power reception device 201 may receive wireless power from the power transmission device 203. The power reception device 201 may be, for example, a smartphone or a wearable device.

The power transmission device 203 may transmit wireless power to the power reception device 201. The power transmission device 203 may be, for example, a wireless charger, a smartphone, or a wearable device.

The power reception device 201 and the power transmission device 203 may transmit and receive power using a wireless power transfer (WPT) coil included in each thereof. For example, the power transmission device 203 may transmit power to the power reception device 201 using the WPT coil (e.g., the coil 321L), and the power reception device 201 may receive power from the power transmission device 203 using the WPT coil (e.g., the coil 311L).

Electronic devices 101 may transmit and receive wireless power to and from each other. At least one of the electronic devices 101 may be a power reception device 201, and at least one of the electronic devices 101 may be a power transmission device 203. The electronic devices 101 may transmit and receive power using a wireless power transfer (WPT) coil included in each thereof. An electronic device

101 may include a power reception device 201 and/or a power transmission device 203.

Referring to FIG. 4A, the power reception device 201 may be a smartphone, and the power transmission device 203 may be a wireless charger. Referring to FIG. 4B, an electronic device 101 may be a smartphone including the power transmission device 203 and the power reception device 201.

Referring to FIG. 4C, the power transmission device 203 may be a smartphone, and the power reception device 201 may be an earbud or a wearable device.

Figure 5A:
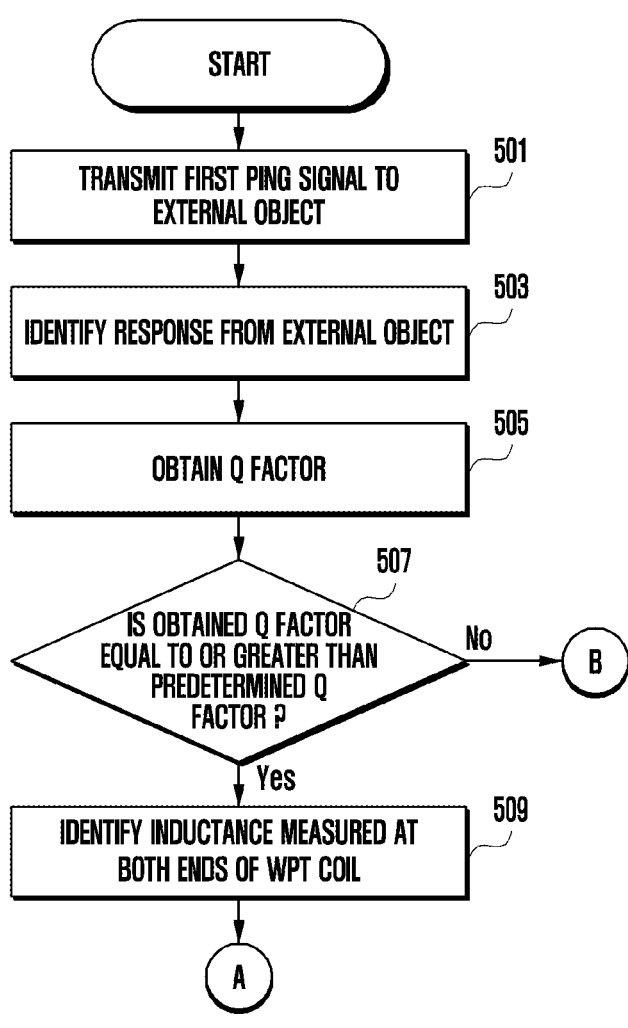

FIG. 5A and FIG. 5B are flowcharts illustrating an example foreign object detection method of an electronic device 101 according to various embodiments.

The electronic device 101 according to an embodiment may be an electronic device including the power transmission device 203 illustrated in FIG. 2 and FIGS. 3A and 3B.

In an embodiment, in operation 501, the electronic device 101 (e.g., the power transmission device 203 of FIG. 2 and FIG. 3B) may transmit a first ping signal to an external object under control of a processor 120 (e.g., the processor 322 of FIG. 3B).

In an embodiment, the electronic device 101 may monitor whether the external object exists on a wireless power interface.

In an embodiment, the external object may be an external electronic device capable of receiving power (e.g., a power reception device 201), an external electronic device incapable of receiving power, a foreign object, or an external electronic device (e.g., the power reception device 201) including a foreign object. For example, the external electronic device including the foreign object may be a power reception device 201 placed together with the foreign object on the electronic device 101.

For example, the electronic device 101 may periodically transmit low power using the sensing circuit 324 or the power transmission circuit 321, and may detect a variance in received power to monitor whether the external object exists on the wireless power interface.

In an embodiment, in operation 501, the electronic device 101 may receive a response signal to the first ping signal from the power reception device 201, and may perform an operation for power transmission.

In an embodiment, in operation 501, the electronic device 101 (e.g., the power transmission device 203 of FIG. 2 and FIG. 3B) may transmit the first ping signal through the transmission coil 321L (e.g., a WPT coil) of the power transmission circuit 321 under control of the processor 120 (e.g., the processor 322 of FIG. 3B).

In an embodiment, the first ping signal may have a predetermined frequency.

In various embodiments, the first ping signal may have a variable frequency, which is a frequency that may change.

In an embodiment, in operation 503, the electronic device 101 (e.g., the power transmission device 203 of FIG. 2 and FIG. 3B) may identify a response from the external object under control of the processor 120 (e.g., the processor 322 of FIG. 3B).

In an embodiment, in operation 503, the electronic device 101 (e.g., the power transmission device 203 of FIG. 2 and FIG. 3B) may identify the response corresponding to the first ping signal from the external object under control of the processor 120 (e.g., the processor 322 of FIG. 3B). For example, the response from the external object may be a signal strength packet.

In an embodiment, when there is the response corresponding to the first ping signal from the external object in operation 503, the electronic device 101 (e.g., the power transmission device 203 of FIG. 2 and FIG. 3B) may determine that the external object includes an external electronic device capable of receiving power (e.g., the power reception device 201) under control of the processor 120 (e.g., the processor 322 of FIG. 3B). In an embodiment, when there is no response corresponding to the first ping signal from the external object in operation 503, the electronic device 101 (e.g., the power transmission device 203 of FIG. 2 and FIG. 3B) may determine that the external object includes an object incapable of receiving power (e.g., an external electronic device or a foreign object incapable of receiving power) under control of the processor 120 (e.g., the processor 322 of FIG. 3B). For example, when the external object is an object incapable of receiving power, a power transmission operation may be stopped.

In an embodiment, in operation 505, the electronic device 101 (e.g., the power transmission device 203 of FIG. 2 and FIG. 3B) may obtain a Q factor under control of the processor 120 (e.g., the processor 322 of FIG. 3B).

In an embodiment, in operation 505, the electronic device 101 (e.g., the power transmission device 203 of FIG. 2 and FIG. 3B) may measure power, voltage, or current while transmitting the first ping signal or after transmitting the first ping signal, and may obtain the Q factor, based on the measured power, voltage, or current, under control of the processor 120 (e.g., the processor 322 of FIG. 3B).

In an embodiment, in operation 505, the electronic device 101 (e.g., the power transmission device 203 of FIG. 2 and FIG. 3B) may measure the power, voltage, or current of the transmission coil 321L (e.g., the WPT coil) while transmitting the first signal or after transmitting the first ping signal, and may obtain the Q factor, based on the measured power, voltage, or current, under control of the processor 120 (e.g., the processor 322 of FIG. 3B).

In an embodiment, in operation 505, the electronic device 101 (e.g., the power transmission device 203 of FIG. 2 and FIG. 3B) may measure the waveform of the power, voltage, or current of the transmission coil 321L (e.g., the WPT coil) while transmitting the first ping signal or after transmitting the first ping signal, and may obtain the Q factor, based on the waveform of the measured power, voltage, or current, under control of the processor 120 (e.g., the processor 322 of FIG. 3B).

In an embodiment, in operation 507, the electronic device 101 (e.g., the power transmission device 203 of FIG. 2 and FIG. 3B) may determine whether the obtained Q factor is equal to or greater than a predetermined Q factor under the control of the processor 120 (e.g., the processor 322 of FIG. 3B).

In an embodiment, when the obtained Q factor is equal to or greater than the predetermined Q factor, the electronic device 101 (e.g., the power transmission device 203 of FIG. 2 and FIG. 3B) may proceed from operation 507 to operation 509 under control of the processor 120 (e.g., the processor 322 of FIG. 3B).

In an embodiment, when the obtained Q factor is less than the predetermined Q factor, the electronic device 101 (e.g., the power transmission device 203 of FIG. 2 and FIG. 3B) may proceed from operation 507 to operation 515 under control of the processor 120 (e.g., the processor 322 of FIG. 3B).

Generally, a coil, such as an inductor, may store energy from the outside. However, the stored energy is dissipated over time by a resistive component of the coil itself, in which case a concept introduced to define the degree of incurred loss is a Q factor. When an external object including a foreign object or an external object as a foreign object is positioned on a wireless power transmission and reception path, a resonance curve is changed, and thus a Q factor may be changed. For example, an external electronic device including a foreign object may be the power reception device 201 placed together with the foreign object on the electronic device 101.

In an embodiment, when the foreign object of the external object including the foreign object is positioned in a central area of the coil, the Q factor tends to decrease. Alternatively, when the external object as the foreign object is positioned in a central area of the coil, the Q factor tends to decrease.

In an embodiment, when the foreign object of the external object including the foreign object is positioned in an outer area of the coil, the Q factor tends to increase. Alternatively, when the external object as the foreign object is positioned in the outer area of the coil, the Q factor tends to increase.

In an embodiment, a Q factor measured when the external object as the foreign object is positioned in a central area of the transmission coil 321L (e.g., the WPT coil) may be less than the predetermined Q factor. Alternatively, a Q factor measured when the foreign object of the external object including the foreign object is positioned in the central area of the transmission coil 321L (e.g., the WPT coil) may be less than the predetermined Q factor.

In an embodiment, when the transmission coil 321L (e.g., the WPT coil) and a reception coil 311L (e.g., a WPT coil) are adjacent to each other, a Q factor measured when the external object as the foreign object is positioned in a central area of the transmission coil 321L (e.g., the WPT coil) and the reception coil 311L (e.g., the WPT coil) may be less than the predetermined Q factor. When the transmission coil 321L (e.g., the WPT coil) and the reception coil 311L (e.g., the WPT coil) are adjacent to each other, a Q factor measured when the foreign object of the external object including the foreign object is positioned in the central area of the transmission coil 321L (e.g., the WPT coil) and the reception coil 311L (e.g., the WPT coil) may be less than the predetermined Q factor.

For example, the determined Q factor may be determined based on the external electronic device (e.g., the power reception device 201) including the reception coil 311L (e.g., the WPT coil).

According to an embodiment, the electronic device 101 (e.g., the power transmission device 203 of FIG. 2 and FIG. 3B) may store predetermined Q factor information based on a characteristic (e.g., device type or coil characteristics) of the external electronic device (e.g., the power reception device 201) in a memory (e.g., the memory 130).

In an embodiment, a Q factor obtained when the external object as the foreign object is positioned in an outer area distant from the central area of the transmission coil 321L (e.g., the WPT coil) may be greater than the predetermined Q factor. Alternatively, when a Q factor obtained when the foreign object of the external object including the foreign object is positioned in the outer area distant from the central area of the transmission coil 321L (e.g., the WPT coil) may be greater than the predetermined Q factor.

In an embodiment, when the transmission coil 321L (e.g., the WPT coil) and the reception coil 311L (e.g., the WPT coil) are adjacent to each other, a Q factor obtained when the external object as the foreign object is positioned in an outer area spaced by a predetermined distance from the central area of the transmission coil 321L (e.g., the WPT coil) and the reception coil 311L (e.g., the WPT coil) may be greater than the predetermined Q factor. Alternatively, a Q factor obtained when the foreign object of the external object including the foreign object is positioned in the outer area spaced by the predetermined distance from the central area of the transmission coil 321L (e.g., the WPT coil) and the reception coil 311L (e.g., the WPT coil) may be greater than the predetermined Q factor.

In an embodiment, in operation 509, the electronic device 101 (e.g., the power transmission device 203 of FIG. 2 and FIG. 3B) may identify inductance measured at both ends of the WPT coil under control of the processor 120 (e.g., the processor 322 of FIG. 3B).

In an embodiment, in operation 509, the electronic device 101 (e.g., the power transmission device 203 of FIG. 2 and FIG. 3B) may identify the inductance measured at both ends of the WPT coil by retransmitting the first ping signal under control of the processor 120 (e.g., the processor 322 of FIG. 3B).

In various embodiments, in operation 509, the electronic device 101 (e.g., the power transmission device 203 of FIG. 2 and FIG. 3B) may identify the inductance measured at both ends of the WPT coil, based on the first ping signal transmitted in operation 501, under control of the processor 120 (e.g., the processor 322 of FIG. 3B).

In an embodiment, a Q factor obtained when the external object as the foreign object exists in a first area may be similar to a Q factor measured when the external object includes no foreign object or the external object is not a foreign object. A Q factor obtained when the foreign object of the external object including the foreign object exists in the first area may be similar to a Q factor measured when the external object includes no foreign object or the external object is not a foreign object.

In an embodiment, the first area may correspond to an outer area of the transmission coil 321L (e.g., the WPT coil).

In an embodiment, when the transmission coil 321L (e.g., the WPT coil) and the reception coil 311L (e.g., the WPT coil) are adjacent to each other, the first area may correspond to an outer area spaced by the predetermined distance from the central area of the first transmission coil 321L (e.g., the WPT coil) and the reception coil 311L (e.g., the WPT coil).

Various embodiments of the disclosure may additionally measure the inductance measured at both ends of the WPT coil as well as the Q factor when the external object as the foreign object exists in the first area or when the foreign object of the external object including the foreign object exists in the first area, thereby more accurately detecting whether a foreign object exists.

In an embodiment, the inductance measured at both ends of the WPT coil may be inductance measured when the transmission coil 321L (WPT coil) and the reception coil 311L (WPT coil) are adjacent to each other.

In various embodiments, the inductance measured at both ends of the WPT coil may be inductance measured when the transmission coil 321L (WPT coil) and the external object are adjacent to each other.

Generally, the power of the first ping signal increases closer to a resonance point, and decreases further from the resonance point. When the foreign object exists in the outer area spaced by the predetermined distance from the central area of the transmission coil 321L (e.g., the WPT coil) and the reception coil 311L (e.g., the WPT coil), the inductance measured at both ends of the WPT coil may be less than predetermined inductance due to the low power of the first ping signal.

In an embodiment, in operation 511, the electronic device 101 (e.g., the power transmission device 203 of FIG. 2 and FIG. 3B) may determine whether the measured inductance is equal to or greater than the predetermined inductance under control of the processor 120 (e.g., the processor 322 of FIG. 3B). The measured inductance may be the inductance measured at both ends of the WPT coil.

In an embodiment, when the measured inductance is equal to or greater than the predetermined inductance, the electronic device 101 (e.g., the power transmission device 203 of FIG. 2 and FIG. 3B) may proceed from operation 511 to operation 513 under control of the processor 120 (e.g., the processor 322 of FIG. 3B).

In an embodiment, when the measured inductance is less than the predetermined inductance, the electronic device 101 (e.g., the power transmission device 203 of FIG. 2 and FIG. 3B) may proceed from operation 511 to operation 519 under control of the processor 120 (e.g., the processor 322 of FIG. 3B).

In an embodiment, when the measured inductance is equal to or greater than the predetermined inductance, the electronic device 101 (e.g., the power transmission device 203 of FIG. 2 and FIG. 3B) may determine that the external object includes no foreign object or the external object is not a foreign object, and may perform a function under control of the processor 120 (e.g., the processor 322 of FIG. 3B) in operation 513. In operation 513, the electronic device 101 (e.g., the power transmission device 203 of FIG. 2 and FIG. 3B) may transmit power to the power reception device 201 through the transmission coil 321L (e.g., the WPT coil) under control of the processor 120 (e.g., the processor 322 of FIG. 3B).

In various embodiments, when the measured inductance is equal to or greater than the predetermined inductance, the electronic device 101 (e.g., the power transmission device 203 of FIG. 2 and FIG. 3B) may identify whether the external object responds, may determine that there is no power reception device when there is no response from the external object, and may stop power transmission under control of the processor 120 (e.g., the processor 322 of FIG. 3B) in operation 513.

In various embodiments, when the measured inductance is equal to or greater than the predetermined inductance, the electronic device 101 (e.g., the power transmission device 203 of FIG. 2 and FIG. 3B) may identify whether the external object responds, and may transmit power to the power reception device 201 when there is a response from the external object under control of the processor 120 (e.g., the processor 322 of FIG. 3B) in operation 513.

In an embodiment, when the measured inductance is less than the predetermined inductance, the electronic device 101 (e.g., the power transmission device 203 of FIG. 2 and FIG. 3B) may determine whether there is a response from the external object under control of the processor 120 (e.g., the processor 322 of FIG. 3B) in operation 519.

In various embodiments, in operation 519, the electronic device 101 (e.g., the power transmission device 203 of FIG. 2 and FIG. 3B) may determine whether there is a response corresponding to the first ping signal from the external object under control of the processor 120 (e.g., the processor 322 of FIG. 3B). The response corresponding to the first ping signal from the external object may be the response from the external object identified in operation 503.

In various embodiments, in operation 519, the electronic device 101 (e.g., the power transmission device 203 of FIG. 2 and FIG. 3B) may retransmit the first ping signal, and may determine whether there is a response corresponding to the first ping signal from the external object under control of the processor 120 (e.g., the processor 322 of FIG. 3B).

In various embodiments, in operation 519, the electronic device 101 (e.g., the power transmission device 203 of FIG.

2 and FIG. 3B) may determine whether there is a response from the external object, based on the response corresponding to the first ping signal from the external object identified in operation 503, under control of the processor 120 (e.g., the processor 322 of FIG. 3B).

In an embodiment, when there is a response from the external object, the electronic device 101 (e.g., the power transmission device 203 of FIG. 2 and FIG. 3B) may proceed from operation 519 to operation 521 under control of the processor 120 (e.g., the processor 322 of FIG. 3B).

In an embodiment, when there is no response from the external object, the electronic device 101 (e.g., the power transmission device 203 of FIG. 2 and FIG. 3B) may proceed from operation 519 to operation 523 under control of the processor 120 (e.g., the processor 322 of FIG. 3B).

In an embodiment, when there is no response from the external object, the electronic device 101 (e.g., the power transmission device 203 of FIG. 2 and FIG. 3B) may determine that the external object as the foreign object exists in the first area under control of the processor 120 (e.g., the processor 322 of FIG. 3B) in operation 523.

In an embodiment, when there is a response from the external object, the electronic device 101 (e.g., the power transmission device 203 of FIG. 2 and FIG. 3B) may determine the external object as the power reception device 201, may determine that the foreign object exists in the first area, and may perform a function under control of the processor 120 (e.g., the processor 322 of FIG. 3B) in operation 521.

In an embodiment, in operation 521, the electronic device 101 (e.g., the power transmission device 203 of FIG. 2 and FIG. 3B) may perform an operation of reducing transmitted power to predetermined power or less as the function.

In an embodiment, in operation 521, when determining that the external object (e.g., the power reception device 201) includes the foreign object, the electronic device 101 (e.g., the power transmission device 203 of FIG. 2 and FIG. 3B) may perform an operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on a display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may control power reception.

When receiving the position of the foreign object from the electronic device 101 (e.g., the power transmission device 203 of FIG. 2 and FIG. 3B), the power reception device 201 may block power reception from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may request stoppage of power transmission from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

When receiving the position of the foreign object from the electronic device 101 (e.g., the power transmission device 203 of FIG. 2 and FIG. 3B), the power reception device 201 may output a notification of the foreign object using a sound and/or vibrations. In an embodiment, when the Q factor obtained in operation 507 is less than the predetermined Q factor, the electronic device 101 (e.g., the power transmission device 203 of FIG. 2 and FIG. 3B) may determine that the foreign object exists in a second area under control of the processor 120 (e.g., the processor 322 of FIG. 3B) in operation 515.

In various embodiments, when the obtained Q factor is less than the predetermined Q factor, the electronic device 101 (e.g., the power transmission device 203 of FIG. 2 and FIG. 3B) may determine that the foreign object of the external object including the foreign object exists in the second area under control of the processor 120 (e.g., the processor 322 of FIG. 3B) in operation 515.

In various embodiments, when the Q factor obtained in operation 507 is less than the predetermined Q factor, the electronic device 101 (e.g., the power transmission device 203 of FIG. 2 and FIG. 3B) may determine that the external object as the foreign object exists in the second area under control of the processor 120 (e.g., the processor 322 of FIG. 3B) in operation 515. In an embodiment, the second area may be a central area of a wireless power transmission path.

In various embodiments, the second area may correspond to a central area of the transmission coil 321L.

In various embodiments, when the transmission coil 321L and the reception coil 311L are adjacent to each other, the second area may correspond to the central area of the transmission coil 321L (e.g., the WPT coil) and the reception coil 311L (e.g., the WPT coil).

In the embodiment of FIG. 5A and FIG. 5B, when the external object exists in the second area, the external object may be detected using the Q factor.

In an embodiment, in operation 517, the electronic device 101 (e.g., the power transmission device 203 of FIG. 2 and FIG. 3B) may stop power transmission, and may perform a function under control of the processor 120 (e.g., the processor 322 of FIG. 3B).

In an embodiment, in operation 517, the electronic device 101 (e.g., the power transmission device 203 of FIG. 2 and FIG. 3B) may stop power transmission, and may perform an operation of transmitting the position of the foreign object to the power reception device 201 as the function under control of the processor 120 (e.g., the processor 322 of FIG. 3B).

Referring to operation 515, the external object as the foreign object may be in the second area, or the foreign object of the external object including the foreign object may be in the second area. In a case of the external object including a foreign object, the external object may be the power reception device 201, and the foreign object may be in the second area. The electronic device 101 may perform the operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on the display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may block power reception.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

Figure 6A:
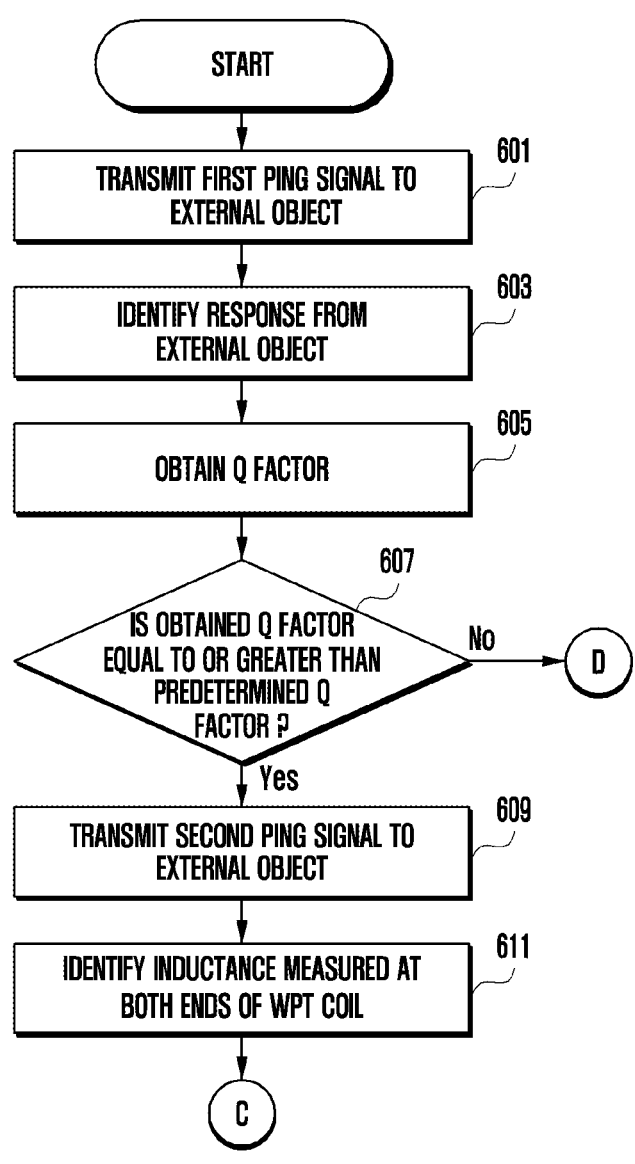
FIG. 6A and FIG. 6B are flowcharts illustrating an example foreign object detection method of an example electronic device according to various embodiments.
Figure 6B:
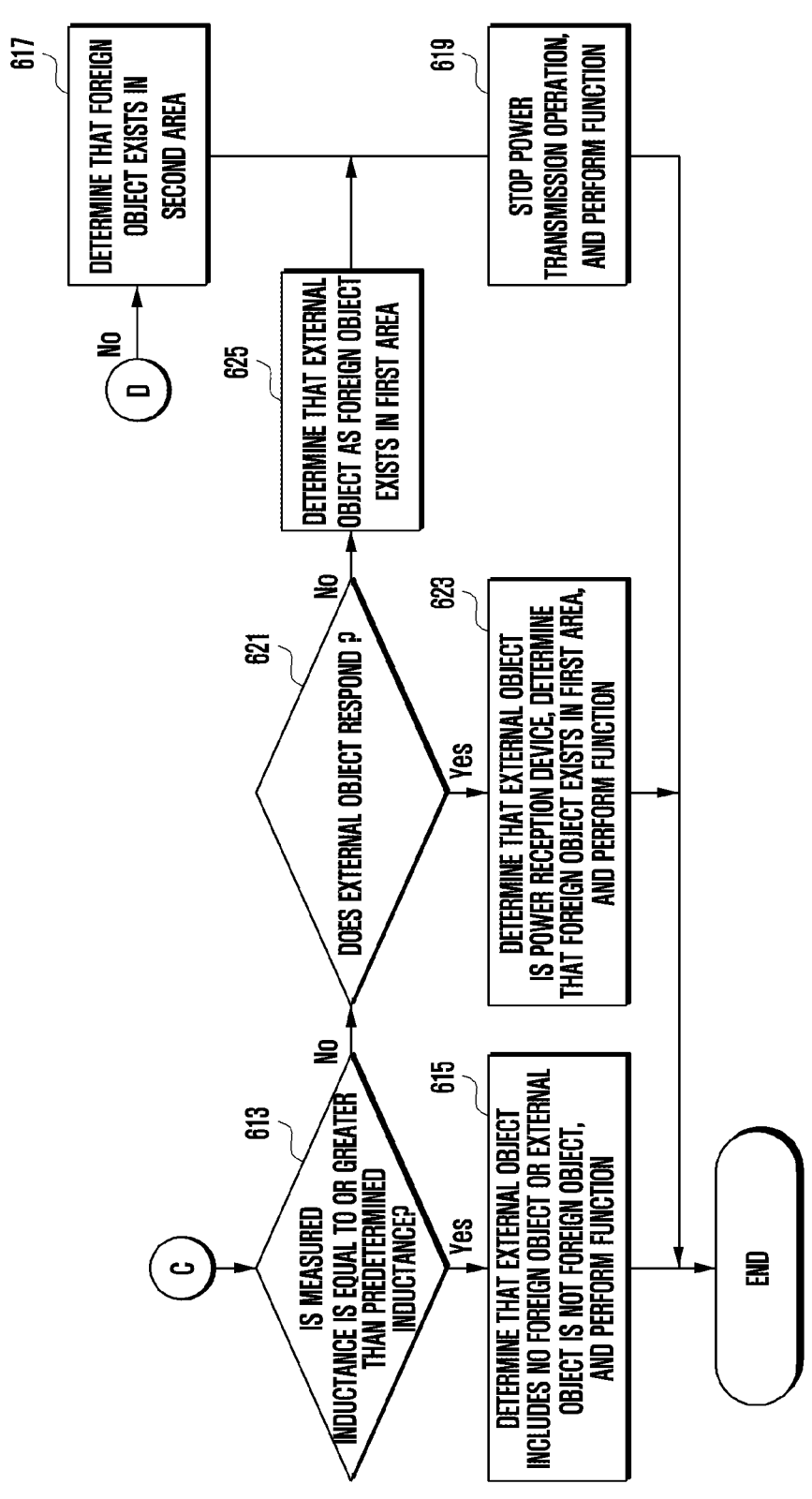

FIG. 6A and FIG. 6B are flowcharts illustrating an example foreign object detection method of an electronic device 101 according to various embodiments.

Compared to the foreign object detection method of FIG. 5A and FIG. 5B, the foreign object detection method of FIG. 6A and FIG. 6B may further include an operation of measuring inductance at both ends of a WPT coil by changing the frequency of a first ping signal. A description of FIG. 6A and FIG. 6B overlapping with that of FIG. 5A and FIG. 5B is not repeated.

The electronic device 101 according to an embodiment may be an electronic device including the power transmission device 203 illustrated in FIG. 2 and FIGS. 3A and 3B.

In an embodiment, in operation 601, the electronic device 101 (e.g., the power transmission device 203 of FIG. 2 and FIG. 3B) may transmit a first ping signal to an external object under control of a processor 120 (e.g., the processor 322 of FIG. 3B).

In an embodiment, in operation 603, the electronic device 101 (e.g., the power transmission device 203 of FIG. 2 and FIG. 3B) may identify a response from the external object under control of the processor 120 (e.g., the processor 322 of FIG. 3B).

In an embodiment, in operation 603, the electronic device 101 (e.g., the power transmission device 203 of FIG. 2 and FIG. 3B) may identify the response corresponding to the first ping signal from the external object under control of the processor 120 (e.g., the processor 322 of FIG. 3B). For example, the response from the external object may be a signal strength packet.

In an embodiment, when there is the response corresponding to the first ping signal from the external object in operation 603, the electronic device 101 (e.g., the power transmission device 203 of FIG. 2 and FIG. 3B) may determine that the external object includes an external electronic device capable of receiving power (e.g., the power reception device 201) under control of the processor 120 (e.g., the processor 322 of FIG. 3B). In an embodiment, when there is no response corresponding to the first ping signal from the external object in operation 603, the electronic device 101 (e.g., the power transmission device 203 of FIG. 2 and FIG. 3B) may determine that the external object includes an object incapable of receiving power (e.g., an external electronic device or a foreign object incapable of receiving power) under control of the processor 120 (e.g., the processor 322 of FIG. 3B). For example, when the external object is an object incapable of receiving power, a power transmission operation may be stopped.

In an embodiment, in operation 605, the electronic device 101 (e.g., the power transmission device 203 of FIG. 2 and FIG. 3B) may obtain a Q factor under control of the processor 120 (e.g., the processor 322 of FIG. 3B).

In an embodiment, in operation 605, the electronic device 101 (e.g., the power transmission device 203 of FIG. 2 and FIG. 3B) may measure power, voltage, or current while transmitting the first ping signal or after transmitting the first ping signal, and may obtain the Q factor, based on the measured power, voltage, or current, under control of the processor 120 (e.g., the processor 322 of FIG. 3B).

In an embodiment, in operation 605, the electronic device 101 (e.g., the power transmission device 203 of FIG. 2 and FIG. 3B) may measure the power, voltage, or current of the transmission coil 321L (e.g., the WPT coil) while transmitting the first signal or after transmitting the first ping signal, and may obtain the Q factor, based on the measured power, voltage, or current, under control of the processor 120 (e.g., the processor 322 of FIG. 3B).

In an embodiment, in operation 605, the electronic device 101 (e.g., the power transmission device 203 of FIG. 2 and FIG. 3B) may measure the waveform of the power, voltage, or current of the transmission coil 321L (e.g., the WPT coil) while transmitting the first ping signal or after transmitting the first ping signal, and may obtain the Q factor, based on the waveform of the measured power, voltage, or current, under control of the processor 120 (e.g., the processor 322 of FIG. 3B).

In an embodiment, in operation 607, the electronic device 101 (e.g., the power transmission device 203 of FIG. 2 and FIG. 3B) may determine whether the obtained Q factor is equal to or greater than a predetermined Q factor under the control of the processor 120 (e.g., the processor 322 of FIG. 3B).

In an embodiment, when the obtained Q factor is equal to or greater than the predetermined Q factor, the electronic device 101 (e.g., the power transmission device 203 of FIG. 2 and FIG. 3B) may proceed from operation 607 to operation 609 under control of the processor 120 (e.g., the processor 322 of FIG. 3B).

In an embodiment, when the obtained Q factor is less than the predetermined Q factor, the electronic device 101 (e.g., the power transmission device 203 of FIG. 2 and FIG. 3B) may proceed from operation 607 to operation 617 under control of the processor 120 (e.g., the processor 322 of FIG. 3B).

In an embodiment, in operation 609, the electronic device 101 (e.g., the power transmission device 203 of FIG. 2 and FIG. 3B) may transmit a second ping signal to the external object under control of the processor 120 (e.g., the processor 322 of FIG. 3B).

In an embodiment, the second ping signal may have a higher frequency than that of the first ping signal.

In an embodiment, the second ping signal may be a signal obtained by changing the frequency of the first ping signal.

In an embodiment, in operation 609, the electronic device 101 (e.g., the power transmission device 203 of FIG. 2 and FIG. 3B) may transmit the second ping signal obtained by changing the frequency of the first ping signal to be greater than a predetermined frequency to the external object under control of the processor 120 (e.g., the processor 322 of FIG. 3B).

In an embodiment, in operation 611, the electronic device 101 (e.g., the power transmission device 203 of FIG. 2 and FIG. 3B) may identify inductance measured at both ends of the WPT coil, based on the second ping signal, under control of the processor 120 (e.g., the processor 322 of FIG. 3B).

In various embodiments, in operation 611, the electronic device 101 (e.g., the power transmission device 203 of FIG. 2 and FIG. 3B) may identify the inductance measured at both ends of the WPT coil, based on the second ping signal obtained by changing the frequency of the first ping signal to be greater than the predetermined frequency, under control of the processor 120 (e.g., the processor 322 of FIG. 3B).

Generally, the inductance measured at both ends of the WPT coil tends to decrease as the frequency of the transmitted signal increases.

In an embodiment, the inductance measured at both ends of the WPT coil may be inductance measured when the transmission coil 321L (e.g., the WPT coil) and a reception coil 311L (e.g., the WPT coil) are adjacent to each other.

In various embodiments, the inductance measured at both ends of the WPT coil may be inductance measured when the transmission coil 321L (e.g., the WPT coil) and the external object are adjacent to each other.

In an embodiment, in operation 613, the electronic device 101 (e.g., the power transmission device 203 of FIG. 2 and FIG. 3B) may determine whether the measured inductance is equal to or greater than predetermined inductance under control of the processor 120 (e.g., the processor 322 of FIG. 3B). The measured inductance may be the inductance measured at both ends of the WPT coil.

In an embodiment, when the measured inductance is equal to or greater than the predetermined inductance, the electronic device 101 (e.g., the power transmission device 203 of FIG. 2 and FIG. 3B) may proceed from operation 613 to operation 615 under control of the processor 120 (e.g., the processor 322 of FIG. 3B).

In an embodiment, when the measured inductance is less than the predetermined inductance, the electronic device 101 (e.g., the power transmission device 203 of FIG. 2 and FIG. 3B) may proceed from operation 613 to operation 621 under control of the processor 120 (e.g., the processor 322 of FIG. 3B).

In an embodiment, when the measured inductance is equal to or greater than the predetermined inductance, the electronic device 101 (e.g., the power transmission device 203 of FIG. 2 and FIG. 3B) may determine that the external object includes no foreign object or the external object is not a foreign object, and may perform a function under control of the processor 120 (e.g., the processor 322 of FIG. 3B) in operation 615.

In various embodiments, when the measured inductance is equal to or greater than the predetermined inductance, the electronic device 101 (e.g., the power transmission device 203 of FIG. 2 and FIG. 3B) may identify whether the external object responds, may determine that there is no power reception device when there is no response from the external object, and may stop power transmission under control of the processor 120 (e.g., the processor 322 of FIG. 3B) in operation 615.

In various embodiments, when the measured inductance is equal to or greater than the predetermined inductance, the electronic device 101 (e.g., the power transmission device 203 of FIG. 2 and FIG. 3B) may identify whether the external object responds, and may transmit power to the power reception device 201 when there is a response from the external object under control of the processor 120 (e.g., the processor 322 of FIG. 3B) in operation 615.

In an embodiment, when the measured inductance is less than the predetermined inductance, the electronic device 101 (e.g., the power transmission device 203 of FIG. 2 and FIG. 3B) may determine whether there is a response from the external object under control of the processor 120 (e.g., the processor 322 of FIG. 3B) in operation 621.

In various embodiments, in operation 621, the electronic device 101 (e.g., the power transmission device 203 of FIG. 2 and FIG. 3B) may determine whether there is a response corresponding to the first ping signal from the external object under control of the processor 120 (e.g., the processor 322 of FIG. 3B). The response corresponding to the first ping signal from the external object may be the response from the external object identified in operation 603.

In various embodiments, in operation 621, the electronic device 101 (e.g., the power transmission device 203 of FIG. 2 and FIG. 3B) may retransmit the first ping signal, and may determine whether there is a response corresponding to the first ping signal from the external object under control of the processor 120 (e.g., the processor 322 of FIG. 3B).

In various embodiments, in operation 621, the electronic device 101 (e.g., the power transmission device 203 of FIG. 2 and FIG. 3B) may determine whether there is a response from the external object, based on the response corresponding to the first ping signal from the external object identified in operation 603, under control of the processor 120 (e.g., the processor 322 of FIG. 3B).

In an embodiment, when there is a response from the external object, the 5 electronic device 101 (e.g., the power transmission device 203 of FIG. 2 and FIG. 3B) may proceed from operation 621 to operation 623 under control of the processor 120 (e.g., the processor 322 of FIG. 3B).

In an embodiment, when there is no response from the external object, the electronic device 101 (e.g., the power transmission device 203 of FIG. 2 and FIG. 3B) may proceed from operation 621 to operation 625 under control of the processor 120 (e.g., the processor 322 of FIG. 3B).

In an embodiment, when there is no response from the external object, the electronic device 101 (e.g., the power transmission device 203 of FIG. 2 and FIG. 3B) may determine that the external object as the foreign object exists in a first area under control of the processor 120 (e.g., the processor 322 of FIG. 3B) in operation 625.

In an embodiment, the first area may correspond to an outer area of the transmission coil 321L (e.g., the WPT coil).

In an embodiment, when the transmission coil 321L (e.g., the WPT coil) and the reception coil 311L (e.g., the WPT coil) are adjacent to each other, the first area may correspond to an outer area spaced by a predetermined distance from a central area of the first transmission coil 321L (e.g., the WPT coil) and the reception coil 311L (e.g., the WPT coil).

In an embodiment, when there is a response from the external object, the electronic device 101 (e.g., the power transmission device 203 of FIG. 2 and FIG. 3B) may determine the external object as the power reception device 201, may determine that the foreign object exists in the first area, and may perform a function under control of the processor 120 (e.g., the processor 322 of FIG. 3B) in operation 623.

In an embodiment, in operation 623, the electronic device 101 (e.g., the power transmission device 203 of FIG. 2 and FIG. 3B) may perform an operation of reducing transmitted power to predetermined power or less as the function.

In an embodiment, in operation 623, when determining that the external object (e.g., the power reception device 201) includes the foreign object, the electronic device 101 (e.g., the power transmission device 203 of FIG. 2 and FIG. 3B) may perform an operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on a display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may control power reception.

When receiving the position of the foreign object from the electronic device 101 (e.g., the power transmission device 203 of FIG. 2 and FIG. 3B), the power reception device 201 may block power reception from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may request stoppage of power transmission from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

When receiving the position of the foreign object from the electronic device 101 (e.g., the power transmission device 203 of FIG. 2 and FIG. 3B), the power reception device 201 may output a notification of the foreign object using a sound and/or vibrations.

In an embodiment, when the Q factor obtained in operation 607 is less than the predetermined Q factor, the electronic device 101 (e.g., the power transmission device 203 of FIG. 2 and FIG. 3B) may determine that the foreign object exists in a second area under control of the processor 120 (e.g., the processor 322 of FIG. 3B) in operation 617.

In various embodiments, when the obtained Q factor is less than the predetermined Q factor, the electronic device 101 (e.g., the power transmission device 203 of FIG. 2 and FIG. 3B) may determine that the foreign object of the external object including the foreign object exists in the second area under control of the processor 120 (e.g., the processor 322 of FIG. 3B) in operation 617.

In various embodiments, when the obtained Q factor is less than the predetermined Q factor, the electronic device 101 (e.g., the power transmission device 203 of FIG. 2 and FIG. 3B) may determine that the external object as the foreign object exists in the second area under control of the processor 120 (e.g., the processor 322 of FIG. 3B) in operation 617.

In an embodiment, the second area may be a central area of a wireless power transmission path.

In various embodiments, the second area may correspond to a central area of the transmission coil 321L (e.g., the WPT coil).

In various embodiments, when the transmission coil 321L (e.g., the WPT coil) and the reception coil 311L (e.g., the WPT coil) are adjacent to each other, the second area may correspond to the central area of the transmission coil 321L (e.g., the WPT coil) and the reception coil 311L (e.g., the WPT coil).

In an embodiment, in operation 619, the electronic device 101 (e.g., the power transmission device 203 of FIG. 2 and FIG. 3B) may stop power transmission, and may perform a function under control of the processor 120 (e.g., the processor 322 of FIG. 3B).

In an embodiment, in operation 619, the electronic device 101 (e.g., the power transmission device 203 of FIG. 2 and FIG. 3B) may stop power transmission, and may perform an operation of transmitting the position of the foreign object to the power reception device 201 as the function under control of the processor 120 (e.g., the processor 322 of FIG. 3B).

Referring to operation 617, the external object as the foreign object may be in the second area, or the foreign object of the external object including the foreign object may be in the second area. In a case of the external object including a foreign object, the external object may be the power reception device 201, and the foreign object may be in the second area. The electronic device 101 may perform the operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on the display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may control power reception.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

Figure 7A:
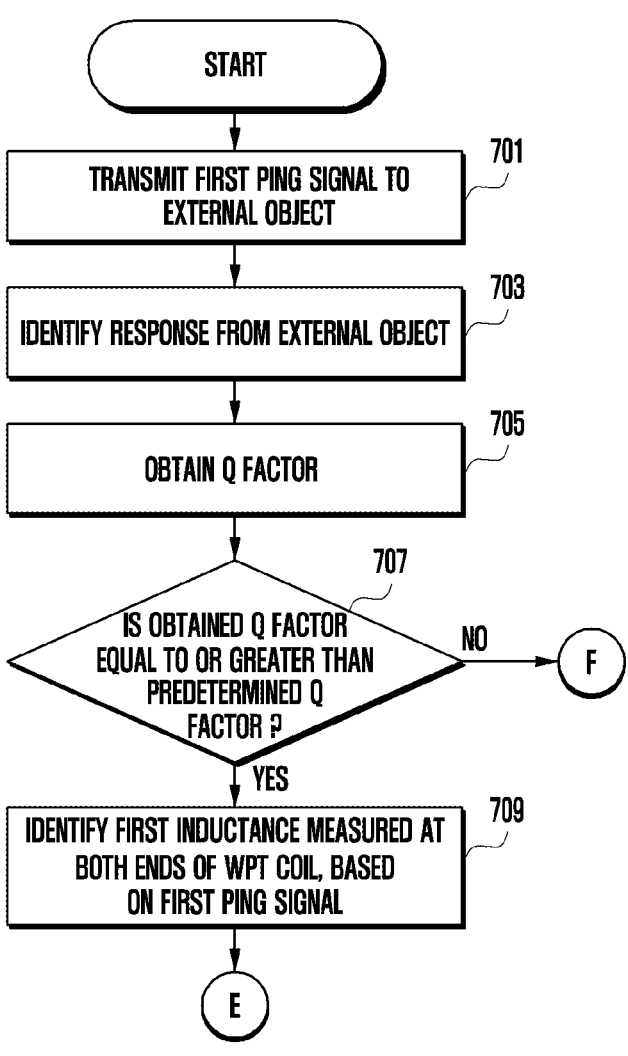

FIG. 7A and FIG. 7B are flowcharts illustrating an example foreign object detection method of an electronic device 101 according to various embodiments.

Compared to the foreign object detection method of FIG. 5A and FIG. 5B, the foreign object detection method of FIG. 7A and FIG. 7B may further include an operation of measuring inductance at both ends of a WPT coil even when an obtained Q factor is less than a predetermined Q factor and an operation of determining whether a foreign object exists, based on the measured inductance. A description of FIG. 7A and FIG. 7B overlapping with that of FIG. 5A, FIG. 5B, FIG. 6A, and FIG. 6B may not be repeated.

The electronic device 101 according to an embodiment may be an electronic device including the power transmission device 203 illustrated in FIG. 2 and FIGS. 3A and 3B.

In an embodiment, in operation 701, the electronic device 101 (e.g., the power transmission device 203 of FIG. 2 and FIG. 3B) may transmit a first ping signal to an external object under control of a processor 120 (e.g., the processor 322 of FIG. 3B).

In an embodiment, in operation 701, the electronic device 101 may receive a response signal to the first ping signal from a power reception device 201, and may perform an operation for power transmission.

In an embodiment, the first ping signal may have a predetermined frequency.

In various embodiments, the first ping signal may have a variable frequency, which is a frequency that may change.

In an embodiment, in operation 703, the electronic device 101 (e.g., the power transmission device 203 of FIG. 2 and FIG. 3B) may identify a response from the external object under control of the processor 120 (e.g., the processor 322 of FIG. 3B).

In an embodiment, in operation 703, the electronic device 101 (e.g., the power transmission device 203 of FIG. 2 and FIG. 3B) may identify the response corresponding to the first ping signal from the external object under control of the processor 120 (e.g., the processor 322 of FIG. 3B). For example, the response from the external object may be a signal strength packet.

In an embodiment, when there is the response corresponding to the first ping signal from the external object in operation 703, the electronic device 101 (e.g., the power transmission device 203 of FIG. 2 and FIG. 3B) may determine that the external object includes an external electronic device capable of receiving power (e.g., the power reception device 201) under control of the processor 120 (e.g., the processor 322 of FIG. 3B). In an embodiment, when there is no response corresponding to the first ping signal from the external object in operation 703, the electronic device 101 (e.g., the power transmission device 203 of FIG. 2 and FIG. 3B) may determine that the external object includes an object incapable of receiving power (e.g., an external electronic device or a foreign object incapable of receiving power) under control of the processor 120 (e.g., the processor 322 of FIG. 3B). For example, when the external object is an object incapable of receiving power, a power transmission operation may be stopped.

In an embodiment, in operation 705, the electronic device 101 (e.g., the power transmission device 203 of FIG. 2 and FIG. 3B) may obtain a Q factor under control of the processor 120 (e.g., the processor 322 of FIG. 3B).

In an embodiment, in operation 705, the electronic device 101 (e.g., the power transmission device 203 of FIG. 2 and FIG. 3B) may measure power, voltage, or current while transmitting the first ping signal or after transmitting the first ping signal, and may obtain the Q factor, based on the measured power, voltage, or current, under control of the processor 120 (e.g., the processor 322 of FIG. 3B).

In an embodiment, in operation 705, the electronic device 101 (e.g., the power transmission device 203 of FIG. 2 and FIG. 3B) may measure the power, voltage, or current of the transmission coil 321L (e.g., the WPT coil) while transmitting the first signal or after transmitting the first ping signal, and may obtain the Q factor, based on the measured power, voltage, or current, under control of the processor 120 (e.g., the processor 322 of FIG. 3B).

In an embodiment, in operation 705, the electronic device 101 (e.g., the power transmission device 203 of FIG. 2 and FIG. 3B) may measure the waveform of the power, voltage, or current of the transmission coil 321L (e.g., the WPT coil) while transmitting the first ping signal or after transmitting the first ping signal, and may obtain the Q factor, based on the waveform of the measured power, voltage, or current, under control of the processor 120 (e.g., the processor 322 of FIG. 3B).

In an embodiment, in operation 707, the electronic device 101 (e.g., the power transmission device 203 of FIG. 2 and FIG. 3B) may determine whether the obtained Q factor is equal to or greater than a predetermined Q factor under the control of the processor 120 (e.g., the processor 322 of FIG. 3B).

In an embodiment, when the obtained Q factor is equal to or greater than the predetermined Q factor, the electronic device 101 (e.g., the power transmission device 203 of FIG. 2 and FIG. 3B) may proceed from operation 707 to operation 709 under control of the processor 120 (e.g., the processor 322 of FIG. 3B).

In an embodiment, when the obtained Q factor is less than the predetermined Q factor, the electronic device 101 (e.g., the power transmission device 203 of FIG. 2 and FIG. 3B) may proceed from operation 707 to operation 721 under control of the processor 120 (e.g., the processor 322 of FIG. 3B).

In an embodiment, in operation 709, the electronic device 101 (e.g., the power transmission device 203 of FIG. 2 and FIG. 3B) may identify first inductance measured at both ends of the WPT coil, based on the first ping signal, under control of the processor 120 (e.g., the processor 322 of FIG. 3B).

In an embodiment, in operation 709, the electronic device 101 (e.g., the power transmission device 203 of FIG. 2 and FIG. 3B) may identify the first inductance measured at both ends of the WPT coil by retransmitting the first ping signal under control of the processor 120 (e.g., the processor 322 of FIG. 3B).

In an embodiment, the first inductance measured at both ends of the WPT coil may be inductance measured when the transmission coil 321L (e.g., the WPT coil) and a reception coil 311L (e.g., the WPT coil) are adjacent to each other.

In various embodiments, the first inductance measured at both ends of the WPT coil may be inductance measured when the transmission coil 321L (e.g., the WPT coil) and the external object are adjacent to each other.

In an embodiment, in operation 711, the electronic device 101 (e.g., the power transmission device 203 of FIG. 2 and FIG. 3B) may determine whether the measured first inductance is equal to or greater than a first predetermined inductance under control of the processor 120 (e.g., the processor 322 of FIG. 3B). The measured first inductance may be the inductance measured at both ends of the WPT coil.

In an embodiment, when the measured first inductance is equal to or greater than the first predetermined inductance, the electronic device 101 (e.g., the power transmission device 203 of FIG. 2 and FIG. 3B) may proceed from operation 711 to operation 713 under control of the processor 120 (e.g., the processor 322 of FIG. 3B).

In an embodiment, when the measured first inductance is less than the first predetermined inductance, the electronic device 101 (e.g., the power transmission device 203 of FIG. 2 and FIG. 3B) may proceed from operation 711 to operation 715 under control of the processor 120 (e.g., the processor 322 of FIG. 3B).

In an embodiment, when the measured first inductance is equal to or greater than the first predetermined inductance, the electronic device 101 (e.g., the power transmission device 203 of FIG. 2 and FIG. 3B) may determine that the external object includes no foreign object or the external object is not a foreign object, and may perform a function under control of the processor 120 (e.g., the processor 322 of FIG. 3B) in operation 713. In operation 713, the electronic device 101 (e.g., the power transmission device 203 of FIG. 2 and FIG. 3B) may transmit power to the power reception device 201 through the transmission coil 321L (e.g., the WPT coil) under control of the processor 120 (e.g., the processor 322 of FIG. 3B).

In various embodiments, when the measured inductance is equal to or greater than the predetermined inductance, the electronic device 101 (e.g., the power transmission device 203 of FIG. 2 and FIG. 3B) may identify whether the external object responds, may determine that there is no power reception device when there is no response from the external object, and may stop power transmission under control of the processor 120 (e.g., the processor 322 of FIG. 3B) in operation 713.

In various embodiments, when the measured inductance is equal to or greater than the predetermined inductance, the electronic device 101 (e.g., the power transmission device 203 of FIG. 2 and FIG. 3B) may identify whether the external object responds, and may transmit power to the power reception device 201 when there is a response from the external object under control of the processor 120 (e.g., the processor 322 of FIG. 3B) in operation 713.

In an embodiment, when the measured first inductance is less than the first predetermined inductance, the electronic device 101 (e.g., the power transmission device 203 of FIG. 2 and FIG. 3B) may determine whether there is a response from the external object under control of the processor 120 (e.g., the processor 322 of FIG. 3B) in operation 715.

In various embodiments, in operation 715, the electronic device 101 (e.g., the power transmission device 203 of FIG. 2 and FIG. 3B) may determine whether there is a response corresponding to the first ping signal from the external object under control of the processor 120 (e.g., the processor 322 of FIG. 3B). The response corresponding to the first ping signal from the external object may be the response from the external object identified in operation 703.

In various embodiments, in operation 715, the electronic device 101 (e.g., the power transmission device 203 of FIG. 2 and FIG. 3B) may retransmit the first ping signal, and may determine whether there is a response corresponding to the first ping signal from the external object under control of the processor 120 (e.g., the processor 322 of FIG. 3B).

In various embodiments, in operation 715, the electronic device 101 (e.g., the power transmission device 203 of FIG. 2 and FIG. 3B) may determine whether there is a response from the external object, based on the response corresponding to the first ping signal from the external object identified in operation 703, under control of the processor 120 (e.g., the processor 322 of FIG. 3B).

In an embodiment, when there is a response from the external object, the electronic device 101 (e.g., the power transmission device 203 of FIG. 2 and FIG. 3B) may proceed from operation 715 to operation 717 under control of the processor 120 (e.g., the processor 322 of FIG. 3B).

In an embodiment, when there is no response from the external object, the electronic device 101 (e.g., the power transmission device 203 of FIG. 2 and FIG. 3B) may proceed from operation 715 to operation 719 under control of the processor 120 (e.g., the processor 322 of FIG. 3B).

In an embodiment, when there is no response from the external object, the electronic device 101 (e.g., the power transmission device 203 of FIG. 2 and FIG. 3B) may determine that the external object as the foreign object exists in a first area, and may stop a power transmission operation under control of the processor 120 (e.g., the processor 322 of FIG. 3B) in operation 719.

In an embodiment, the first area may correspond to an outer area of the transmission coil 321L (e.g., the WPT coil).

In an embodiment, when the transmission coil 321L (e.g., the WPT coil) and the reception coil 311L (e.g., the WPT coil) are adjacent to each other, the first area may correspond to an outer area spaced by a predetermined distance from a central area of the first transmission coil 321L (e.g., the WPT coil) and the reception coil 311L (e.g., the WPT coil).

In an embodiment, when there is a response from the external object, the electronic device 101 (e.g., the power transmission device 203 of FIG. 2 and FIG. 3B) may determine the external object as the power reception device 201, may determine that the foreign object exists in the first area, and may perform a function under control of the processor 120 (e.g., the processor 322 of FIG. 3B) in operation 717.

In an embodiment, in operation 717, the electronic device 101 (e.g., the power transmission device 203 of FIG. 2 and FIG. 3B) may perform an operation of reducing transmitted power to predetermined power or less as the function.

In an embodiment, in operation 717, when determining that the external object (e.g., the power reception device 201) includes the foreign object, the electronic device 101 (e.g., the power transmission device 203 of FIG. 2 and FIG. 3B) may perform an operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on a display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may control power reception.

When receiving the position of the foreign object from the electronic device 101 (e.g., the power transmission device 203 of FIG. 2 and FIG. 3B), the power reception device 201 may block power reception from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may request stoppage of power transmission from the electronic device 101 when the power reception device 201 experiences heat generation while receiving power and thus enters a heat generation mode.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

When receiving the position of the foreign object from the electronic device 101 (e.g., the power transmission device 203 of FIG. 2 and FIG. 3B), the power reception device 201 may output a notification of the foreign object using a sound and/or vibrations.

In an embodiment, when the Q factor obtained in operation 707 is less than the predetermined Q factor, the electronic device 101 (e.g., the power transmission device 203 of FIG. 2 and FIG. 3B) may identify second inductance measured at both ends of the WPT coil, based on a third ping signal, under control of the processor 120 (e.g., the processor 322 of FIG. 3B) in operation 721.

In an embodiment, the first ping signal and the third ping signal may include different frequencies. The frequency of the first ping signal may be higher than the frequency of the third ping signal.

In an embodiment, the first ping signal and the third ping signal may have the same frequency.

In various embodiments, in operation 721, the electronic device 101 (e.g., the power transmission device 203 of FIG. 2 and FIG. 3B) may transmit the third ping signal to the external object, and may identify the second inductance measured at both ends of the WPT coil under control of the processor 120 (e.g., the processor 322 of FIG. 3B).

In an embodiment, in operation 723, the electronic device 101 (e.g., the power transmission device 203 of FIG. 2 and FIG. 3B) may determine whether the measured second inductance is equal to or greater than a second predetermined inductance under control of the processor 120 (e.g., the processor 322 of FIG. 3B). The measured second inductance may be the inductance measured at both ends of the WPT coil.

The second predetermined inductance may be same as the first predetermined inductance. In various embodiments, the second predetermined inductance may be different from the first predetermined inductance.

In an embodiment, when the measured second inductance is equal to or greater than the second predetermined inductance, the electronic device 101 (e.g., the power transmission device 203 of FIG. 2 and FIG. 3B) may proceed from operation 723 to operation 725 under control of the processor 120 (e.g., the processor 322 of FIG. 3B).

In an embodiment, when the measured second inductance is less than the second predetermined inductance, the electronic device 101 (e.g., the power transmission device 203 of FIG. 2 and FIG. 3B) may proceed from operation 723 to operation 727 under control of the processor 120 (e.g., the processor 322 of FIG. 3B).

In an embodiment, when the measured second inductance is equal to or greater than the second predetermined inductance, the electronic device 101 (e.g., the power transmission device 203 of FIG. 2 and FIG. 3B) may perform a function, based on whether the external object responds under control of the processor 120 (e.g., the processor 322 of FIG. 3B) in operation 725.

In various embodiments, in operation 725, the electronic device 101 (e.g., the power transmission device 203 of FIG. 2 and FIG. 3B) may retransmit the first ping signal, and may determine whether there is a response corresponding to the first ping signal from the external object under control of the processor 120 (e.g., the processor 322 of FIG. 3B).

In various embodiments, in operation 725, the electronic device 101 (e.g., the power transmission device 203 of FIG. 2 and FIG. 3B) may determine whether there is a response from the external object, based on the response corresponding to the first ping signal from the external object identified in operation 703, under control of the processor 120 (e.g., the processor 322 of FIG. 3B).

In various embodiments, when the measured second inductance is equal to or greater than the second predetermined inductance, if there is a response from the external object, the electronic device 101 (e.g., the power transmission device 203 of FIG. 2 and FIG. 3B) may determine the external object as the power reception device 201, and may transmit power to the external object under control of the processor 120 (e.g., the processor 322 of FIG. 3B) in operation 725.

In various embodiments, when the measured second inductance is equal to or greater than the second predetermined inductance, if there is a response from the external object, the electronic device 101 (e.g., the power transmission device 203 of FIG. 2 and FIG. 3B) may determine that there is no foreign object, and may transmit power to the external object under control of the processor 120 (e.g., the processor 322 of FIG. 3B) in operation 725.

In various embodiments, when the measured second inductance is equal to or greater than the second predetermined inductance, if there is no response from the external object, the electronic device 101 (e.g., the power transmission device 203 of FIG. 2 and FIG. 3B) may stop the power transmission operation under control of the processor 120 (e.g., the processor 322 of FIG. 3B) in operation 725.

In an embodiment, the electronic device 101 (e.g., the power transmission device 203 of FIG. 2 and FIG. 3B) may determine that the foreign object exists in a second area under control of the processor 120 (e.g., the processor 322 of FIG. 3B) in operation 727.

In an embodiment, the second area may be a central area of a wireless power transmission path.

In various embodiments, the second area may correspond to a central area of the transmission coil 321L.

In various embodiments, when the transmission coil 321L and the reception coil 311L are adjacent to each other, the second area may correspond to the central area of the transmission coil 321L (e.g., the WPT coil) and the reception coil 311L (e.g., the WPT coil).

In an embodiment, in operation 727, the electronic device 101 (e.g., the power transmission device 203 of FIG. 2 and FIG. 3B) may perform an operation of stopping power transmission as the function.

In an embodiment, in operation 727, when determining that the external object (e.g., the power reception device 201) includes the foreign object, the electronic device 101 (e.g., the power transmission device 203 of FIG. 2 and FIG. 3B) may stop power transmission, and may perform an operation of transmitting the position of the foreign object to the power reception device 201 as the function.

When receiving the position of the foreign object from the electronic device 101 (e.g., the power transmission device 203 of FIG. 2 and FIG. 3B), the power reception device 201 may display a graphic user interface relating to existence of the foreign object on the display 315 (e.g., the display module 160 of FIG. 1) corresponding to the position of the foreign object.

When receiving the position of the foreign object from the electronic device 101 (e.g., the power transmission device 203 of FIG. 2 and FIG. 3B), the power reception device 201 may control power reception.

When receiving the position of the foreign object from the electronic device 101 (e.g., the power transmission device 203 of FIG. 2 and FIG. 3B), the power reception device 201 may display a notification of the foreign object via a user interface (e.g., pop-up) on the display 315 (e.g., the display module 160 of FIG. 1).

When receiving the position of the foreign object from the electronic device 101 (e.g., the power transmission device 203 of FIG. 2 and FIG. 3B), the power reception device 201 may output a notification of the foreign object using a sound and/or vibrations.

Figure 8:
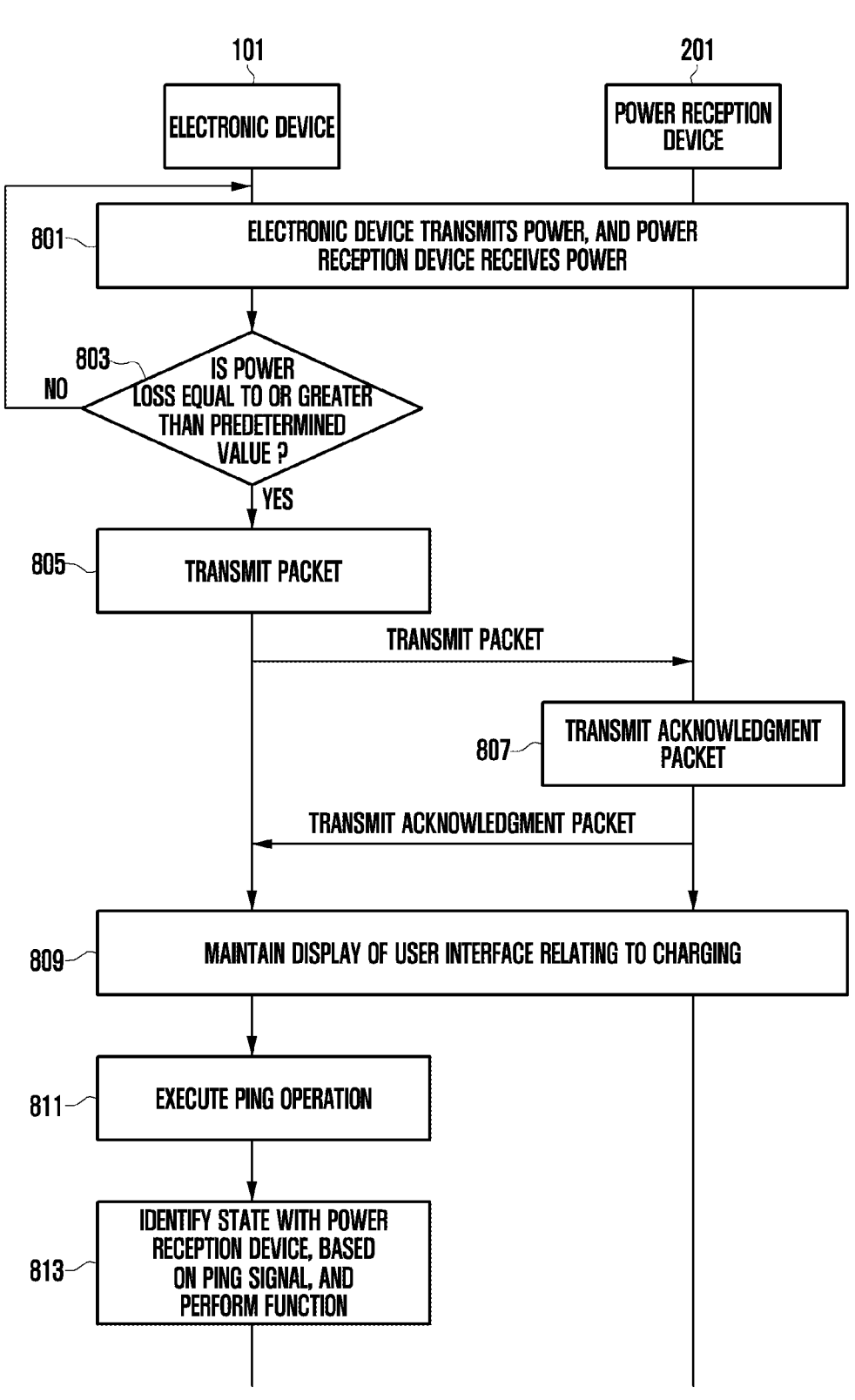
FIG. 8 is a flowchart illustrating an example foreign object detection method of an example electronic device according to various embodiments.

FIG. 8 is a flowchart illustrating an example foreign object detection method of an electronic device 101 according to various embodiments.

Compared to the foreign object detection methods illustrated in FIG. 5A, FIG. 5B, FIG. 6A, FIG. 6B, FIG. 7A, and FIG. 7B, the external object detection method of FIG. 8 may further include an operation of detecting a foreign object when power loss occurs during power transmission of the electronic device 101 (e.g., the power transmission device 203 of FIG. 2 and FIG. 3B).

In an embodiment, in operation 801, the electronic device 101 (e.g., the power transmission device 203 of FIG. 2 and FIG. 3B) may transmit power to a power reception device 201 under control of a processor 120 (e.g., the processor 322 of FIG. 3B).

In an embodiment, in operation 801, the power reception device 201 may receive the power transmitted from the electronic device 101 (e.g., the power transmission device 203 of FIG. 2 and FIG. 3B) under control of the processor 312.

In an embodiment, in operation 803, the electronic device 101 (e.g., the power transmission device 203 of FIG. 2 and FIG. 3B) may determine whether power loss is equal to or greater than a predetermined value under control of the processor 120 (e.g., the processor 322 of FIG. 3B).

In an embodiment, in operation 803, the electronic device 101 (e.g., the power transmission device 203 of FIG. 2 and FIG. 3B) may determine the power loss, based on the transmitted power and information received from the power reception device 201, under control of the processor 120 (e.g., the processor 322 of FIG. 3B). When the electronic device 101 (e.g., the power transmission device 203 of FIG. 2 and FIG. 3B) transmits the power to the power reception device 201, the power reception device 201 may transmit information about the level of received power (e.g., a received power packet) to the electronic device 101 (e.g., the power transmission device 203 of FIG. 2 and FIG. 3B). The electronic device 101 (e.g., the power transmission device 203 of FIG. 2 and FIG. 3B) may identify the level of lost power, based on the transmitted power and the information about the level of the received power. In operation 803, the electronic device 101 (e.g., the power transmission device 203 of FIG. 2 and FIG. 3B) may determine whether the level of the lost power is equal to or greater than the predetermined value under control of the processor 120 (e.g., the processor 322 of FIG. 3B). When the power loss is equal to or greater than the predetermined value, the electronic device 101 (e.g., the power transmission device 203 of FIG. 2 and FIG. 3B) may proceed from operation 803 to operation 805 under control of the processor 120 (e.g., the processor 322 of FIG. 3B).

When the power loss is less than the predetermined value, the electronic device 101 (e.g., the power transmission device 203 of FIG. 2 and FIG. 3B) may proceed from operation 803 to operation 801 under control of the processor 120 (e.g., the processor 322 of FIG. 3B).

When the power loss is equal to or greater than the predetermined value, the electronic device 101 (e.g., the power transmission device 203 of FIG. 2 and FIG. 3B) may transmit a packet under control of the processor 120 (e.g., the processor 322 of FIG. 3B) in operation 805. The packet transmitted by the electronic device 101 may be a packet indicating that an operation of detecting an external object is performed.

In an embodiment, when receiving the packet from the electronic device 101 (e.g., the power transmission device 203 of FIG. 2 and FIG. 3B), the power reception device 201 may transmit an acknowledgment packet to the electronic device 101 (e.g., the power transmission device 203 of FIG. 2 and FIG. 3B) under the control of the processor 312 in operation 807.

In an embodiment, in operation 809, the electronic device 101 (e.g., the power transmission device 203 of FIG. 2 and FIG. 3B) may maintain display of a user interface relating to charging under control of the processor 120 (e.g., the processor 322 of FIG. 3B).

In operation 809, the electronic device 101 (e.g., the power transmission device 203 of FIG. 2 and FIG. 3B) and the power reception device 201 may exchange an agreed packet operating as if maintaining power transmission and power reception. When the electronic device 101 (e.g., the power transmission device 203 of FIG. 2 and FIG. 3B) and the power reception device 201 exchange the agreed packet, display of the user interface relating to charging may be maintained.

In an embodiment, in operation 811, the electronic device 101 (e.g., the power transmission device 203 of FIG. 2 and FIG. 3B) may execute a ping operation under control of the processor 120 (e.g., the processor 322 of FIG. 3B). In the ping operation, the electronic device 101 may transmit a ping signal to the power reception device 201.

In an embodiment, in operation 813, the electronic device 101 (e.g., the power transmission device 203 of FIG. 2 and FIG. 3B) may identify a state with the power reception device 201, based on the ping signal, and may perform a function under control of the processor 120 (e.g., the processor 322 of FIG. 3B).

In various embodiments, in operation 813, the electronic device 101 (e.g., the power transmission device 203 of FIG. 2 and FIG. 3B) may determine whether there is a foreign object between the power transmission device and the power reception device 201, based on the ping signal under control of the processor 120 (e.g., the processor 322 of FIG. 3B).

In various embodiments, in operation 813, the electronic device 101 (e.g., the power transmission device 203 of FIG. 2 and FIG. 3B) may identify an alignment state for power transmission with the power reception device 201, based on the ping signal, under control of the processor 120 (e.g., the processor 322 of FIG. 3B).

In various embodiments, in operation 813, when the electronic device 101 and the power reception device 201 perform a fast charging operation, the electronic device 101 (e.g., the power transmission device 203 of FIG. 2 and FIG. 3B) may change a transmission power level to a normal charging operation (e.g., a 5 V charging operation) under control of the processor 120 (e.g., the processor 322 of FIG. 3B) in operation 813.

In various embodiments, in operation 813, when the electronic device 101 and the power reception device 201 perform the normal charging operation (e.g., a 5 V charging operation), the electronic device 101 (e.g., the power transmission device 203 of FIG. 2 and FIG. 3B) may maintain the power transmission level under control of the processor 120 (e.g., the processor 322 of FIG. 3B) in operation 813.

Determining whether there is the foreign object and performing the function in operation 813 may be the same as at least one of the foreign object detection methods illustrated in FIG. 5A, FIG. 5B, FIG. 6A, FIG. 6B, FIG. 7A, and FIG. 7B.

In various embodiments, when determining that there is no foreign object, the electronic device 101 (e.g., the power transmission device 203 of FIG. 2 and FIG. 3B) may maintain a power transmission operation under control of the processor 120 (e.g., the processor 322 of FIG. 3B) in operation 813.

In various embodiments, when determining that there is no foreign object, the electronic device 101 (e.g., the power transmission device 203 of FIG. 2 and FIG. 3B) may change to the fast charging operation to transmit power under control of the processor 120 (e.g., the processor 322 of FIG. 3B) in operation 813.

In various embodiments, when the power loss is equal to or greater than the 5 predetermined value in absence of a foreign object, the electronic device 101 (e.g., the power transmission device 203 of FIG. 2 and FIG. 3B) may determine that there is an abnormality in alignment between the transmission coil 321L and the reception coil 311L between the electronic device 101 and the power reception device 201 under control of the processor 120 (e.g., the processor 322 of FIG. 3B) in operation 813. The electronic device 101 (e.g., the power transmission device 203 of FIG. 2 and FIG. 3B) may make a request for an alignment for power transmission from the power reception device 201 under control of the processor 120 (e.g., the processor 322 of FIG. 3B) in operation 813. The power reception device 201 may notify a user of the request for the alignment for power transmission by displaying a user interface with respect to the request on a display 315 or by outputting a sound.

In various embodiments, when determining that there is a foreign object, the electronic device 101 (e.g., the power transmission device 203 of FIG. 2 and FIG. 3B) may stop power transmission or may reduce the level of transmitted power under control of the processor 120 (e.g., the processor 322 of FIG. 3B) in operation 813.

In various embodiments, when determining that there is a foreign object, the electronic device 101 (e.g., the power transmission device 203 of FIG. 2 and FIG. 3B) may stop power transmission or may reduce the level of transmitted power, and may notify the user of information on the existence of the foreign object using at least one of a sound, vibrations, and a visual interface under control of the processor 120 (e.g., the processor 322 of FIG. 3B) in operation 813.

Figure 9A:
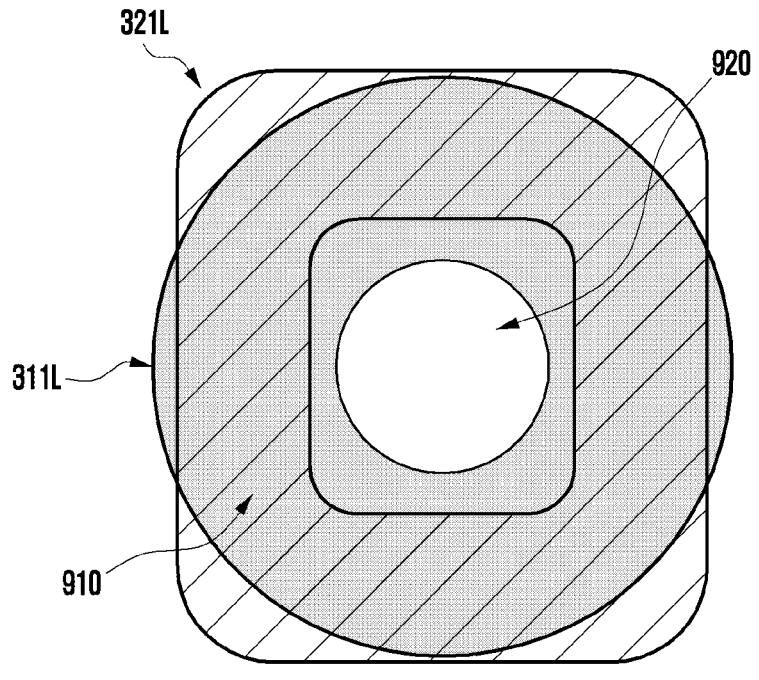
FIG. 9A, 9B, and FIG. 9C illustrate a position between coils and the position of a foreign object according to various embodiments.
Figure 9B:
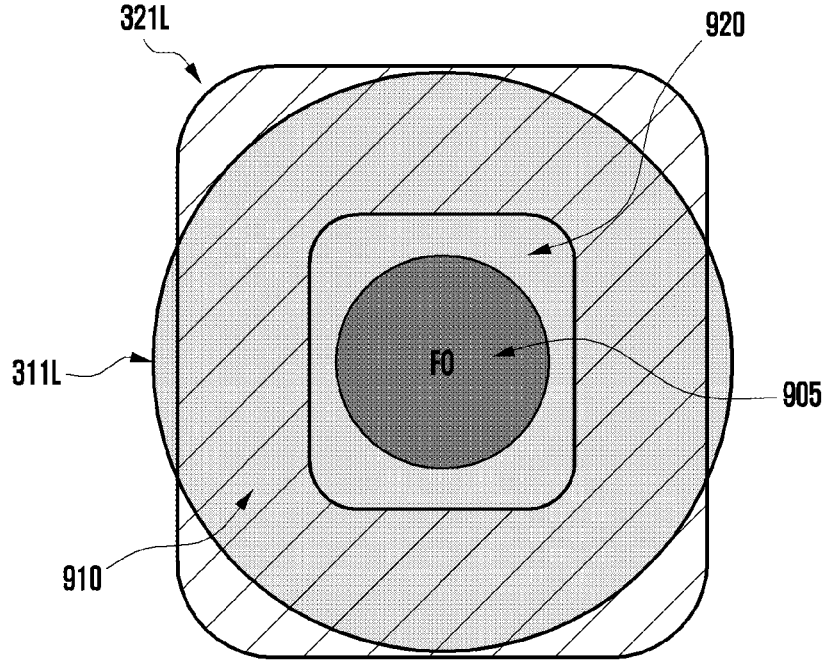
Figure 9C:
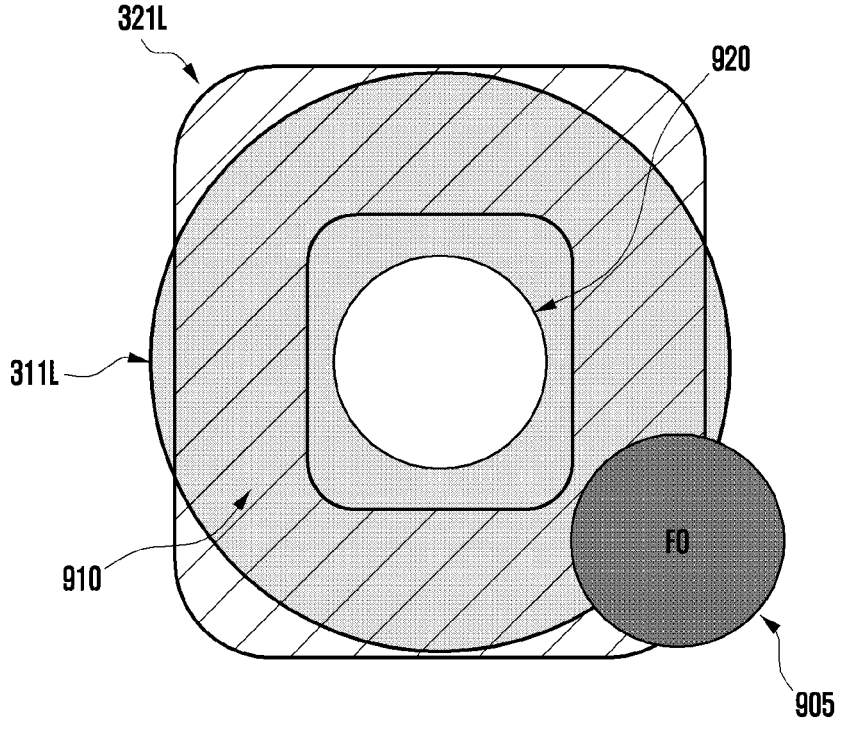

FIGS. 9A, 9B, and 9C illustrate a position between coils and the position of a foreign object according to various embodiments.

FIG. 9A illustrates a position between coils when there is no foreign object 905.

Referring to FIG. 9A, when a transmission coil 321L (e.g., a WPT coil) and a reception coil 311L (e.g., a WPT coil) are adjacent to each other, a central area adjacent to a resonance point may be referred to as a second area 920, and an area corresponding to an outer area spaced by a predetermined distance from the second area may be referred to as a first area 910.

In an embodiment, the first area 910 may be a surrounding area of a wireless power transmission path. The first area 910 may correspond to an outer area of the transmission coil 321L (e.g., the WPT coil). The first area 910 may correspond to an outer area spaced by a predetermined distance from a central area of the transmission coil 321L (e.g., the WPT coil) and the reception coil 311L (e.g., the WPT coil).

In an embodiment, the second area 920 may be a central area of the wireless power transmission path. The second area 920 may correspond to a central area of the transmission coil 321L (e.g., the WPT coil). For example, the second area 1020 may be a position corresponding to an inner length of the transmission coil 321L. The second area 920 may correspond to the central area of the transmission coil 321L (e.g., the WPT coil) and the reception coil 311L (e.g., the WPT coil).

FIG. 9B illustrates a position between coils when a foreign object 905 exists in the second area 920.

Referring to FIG. 9B, when the foreign object exists in the second area 920 that is the central area of the wireless power transmission path, a Q factor measured by the electronic device 101 (e.g., the power transmission device 203 of FIG. 2 and FIG. 3B) may be less than that when there is no foreign object.

FIG. 9C illustrates a position between coils when the foreign object 905 exists in the first area 910.

Referring to FIG. 9C, when the foreign object exists in the first area 910 that is the central area of the wireless power transmission path, the Q factor measured by the electronic device 101 (e.g., the power transmission device 203 of FIG. 2 and FIG. 3B) may be greater than that when there is no foreign object.

Figure 10:
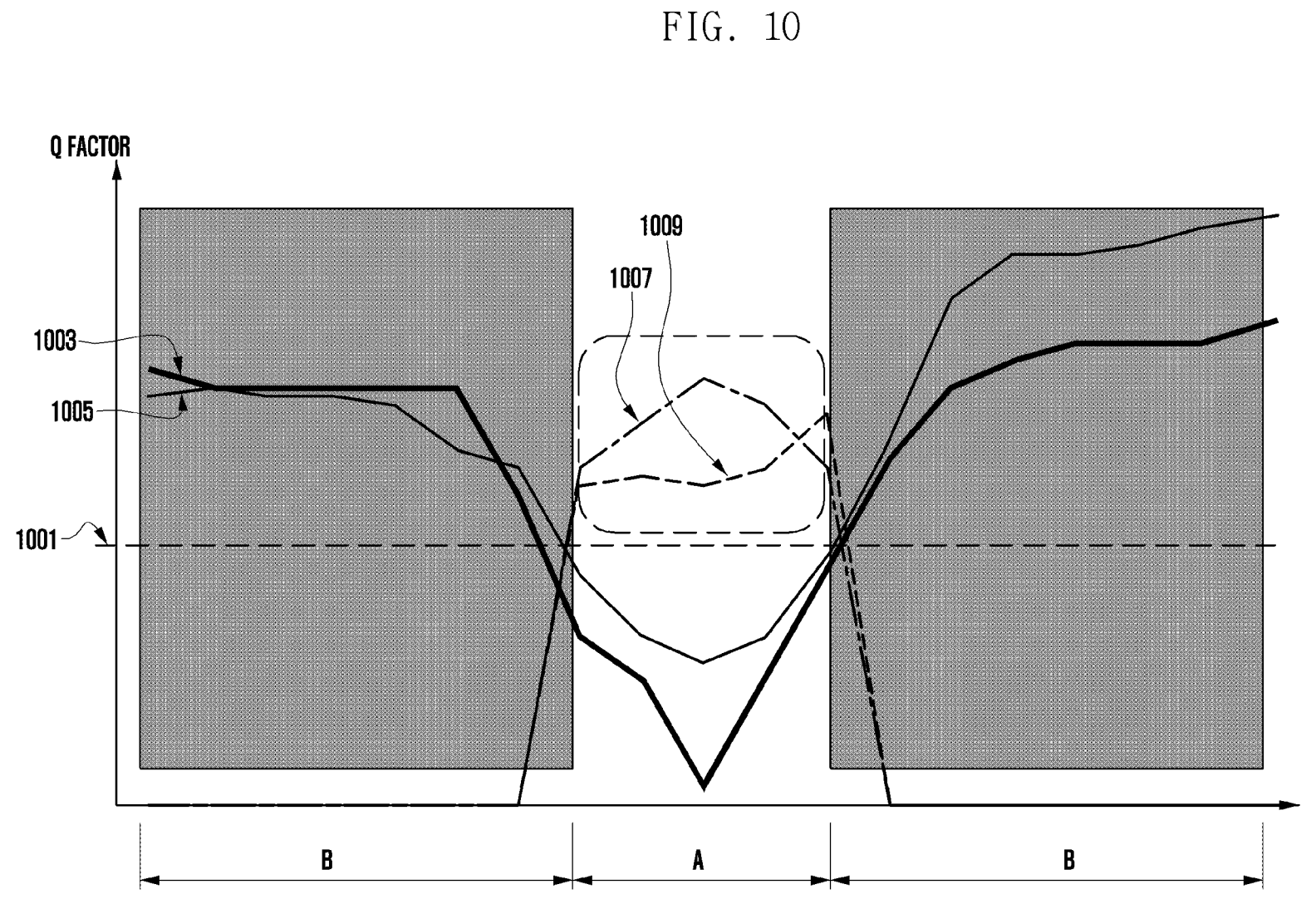

FIG. 10 is a graph illustrating a Q factor measured according to the existence and position of a foreign object according to various embodiments.

In FIG. 10, 1001 is a predetermined Q factor, which may denote a threshold value. When the foreign object exists between a transmission coil 321L (e.g., a WPT coil) and a reception coil 311L (e.g., a WPT coil), an electronic device 101 (e.g., the power transmission device 203 of FIG. 2 and FIG. 3B) may determine the existence and position of the foreign object, based on the predetermined Q factor 1001.

Graph 1003 and graph 1005 illustrate a Q factor measured based on the position of the foreign object when the foreign object is positioned between the transmission coil 321L (e.g., the WPT coil) and the reception coil 311L (e.g., the WPT coil).

Graph 1007 and graph 1009 illustrate a Q factor when there is no foreign object between the transmission coil 321L (e.g., the WPT coil) and the reception coil 311L (e.g., the WPT coil).

Referring to graph 1003 and graph 1005, when the foreign object is positioned in a central area A of the transmission coil 321L (e.g., the WPT coil) and reception coil 311L (e.g., the WPT coil), the Q factor may be less than the predetermined Q factor 1001. When the measured Q factor is less than the predetermined Q factor 1001, the electronic device 101 (e.g., the power transmission device 203 of FIG. 2 and FIG. 3B) may determine that the foreign object is positioned in the central area A.

Referring to graph 1003 and graph 1005, when the foreign object is positioned in a surrounding area B of the transmission coil 321L and the reception coil 311L (e.g., the WPT coil), the Q factor may be greater than the predetermined Q factor 1001. When the measured Q factor is greater than the predetermined Q factor 1001, the electronic device 101 (e.g., the power transmission device 203 of FIG. 2 and FIG. 3B) may determine that the foreign object is positioned in the surrounding area B.

Figure 11:
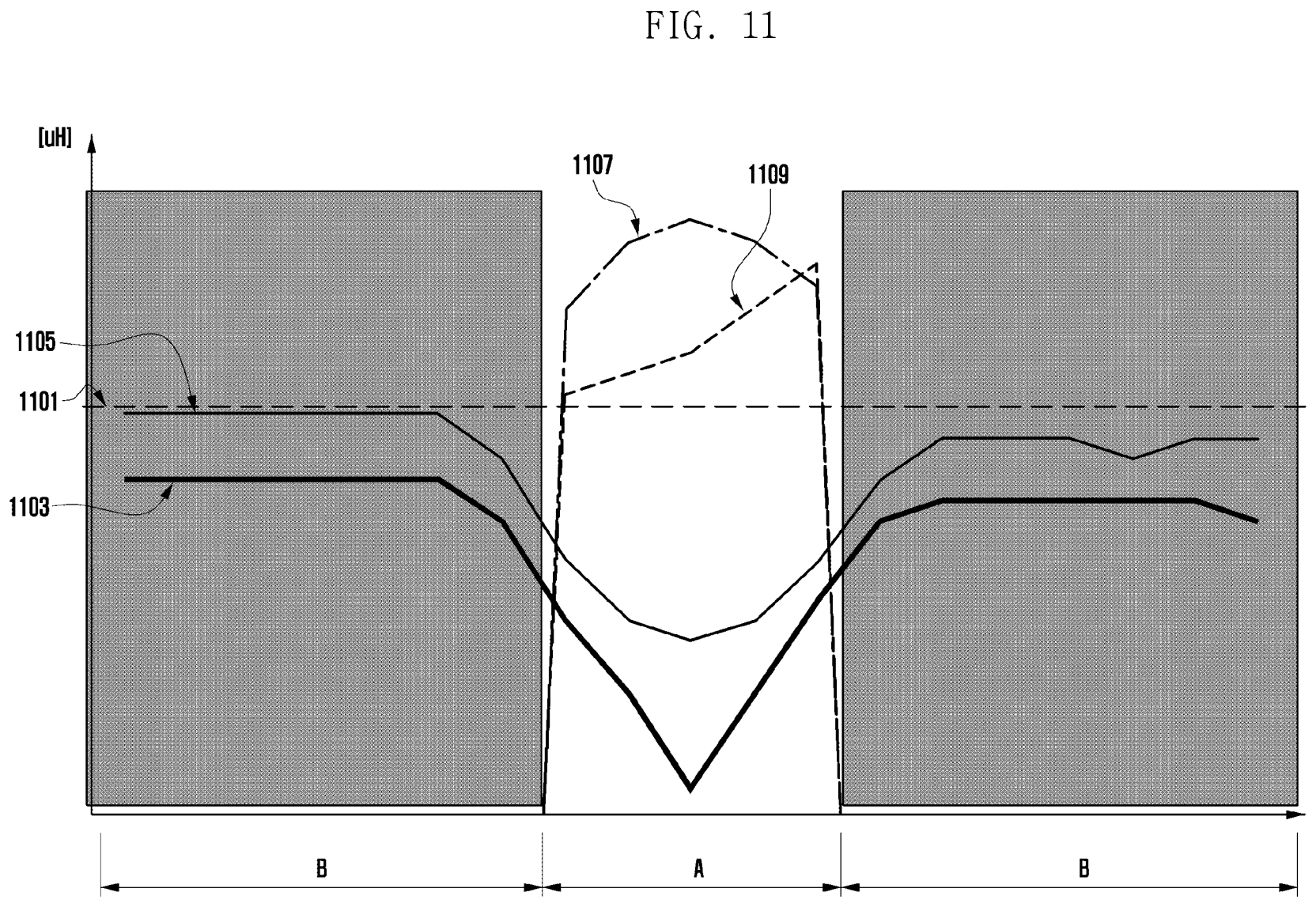

FIG. 11 is a graph illustrating inductance measured at both ends of a WPT coil according to the existence and position of a foreign object according to various embodiments.

In FIG. 11, first inductance 1101 is predetermined inductance, which may denote a threshold value. When the foreign object exists between a transmission coil 321L (e.g., a WPT coil) and a reception coil 311L (e.g., a WPT coil), an electronic device 101 (e.g., the power transmission device 203 of FIG. 2 and FIG. 3B) may determine the existence and position of the foreign object, based on the first inductance 1101.

Graph 1103 and graph 1105 illustrate inductance at both ends of the WPT coil measured based on the position of the foreign object when the foreign object is positioned between the transmission coil 321L (e.g., the WPT coil) and the reception coil 311L (e.g., the WPT coil).

Graph 1107 and graph 1109 illustrate inductance measured at both ends of the WPT coil when there is no foreign object between the transmission coil 321L (e.g., the WPT coil) and the reception coil 311L (e.g., the WPT coil).

Referring to graph 1103 and graph 1105, when the foreign object is positioned in a central area A and a surrounding area B of the transmission coil 321L (e.g., the WPT coil) and reception coil 311L (e.g., the WPT coil), the inductance measured at both ends of the WPT coil may be less than the first inductance 1101. When the inductance measured at both ends of the WPT coil is less than the first inductance 1101, the electronic device 101 (e.g., the power transmission device 203 of FIG. 2 and FIG. 3B) may determine that the foreign object exists.

Figure 12:
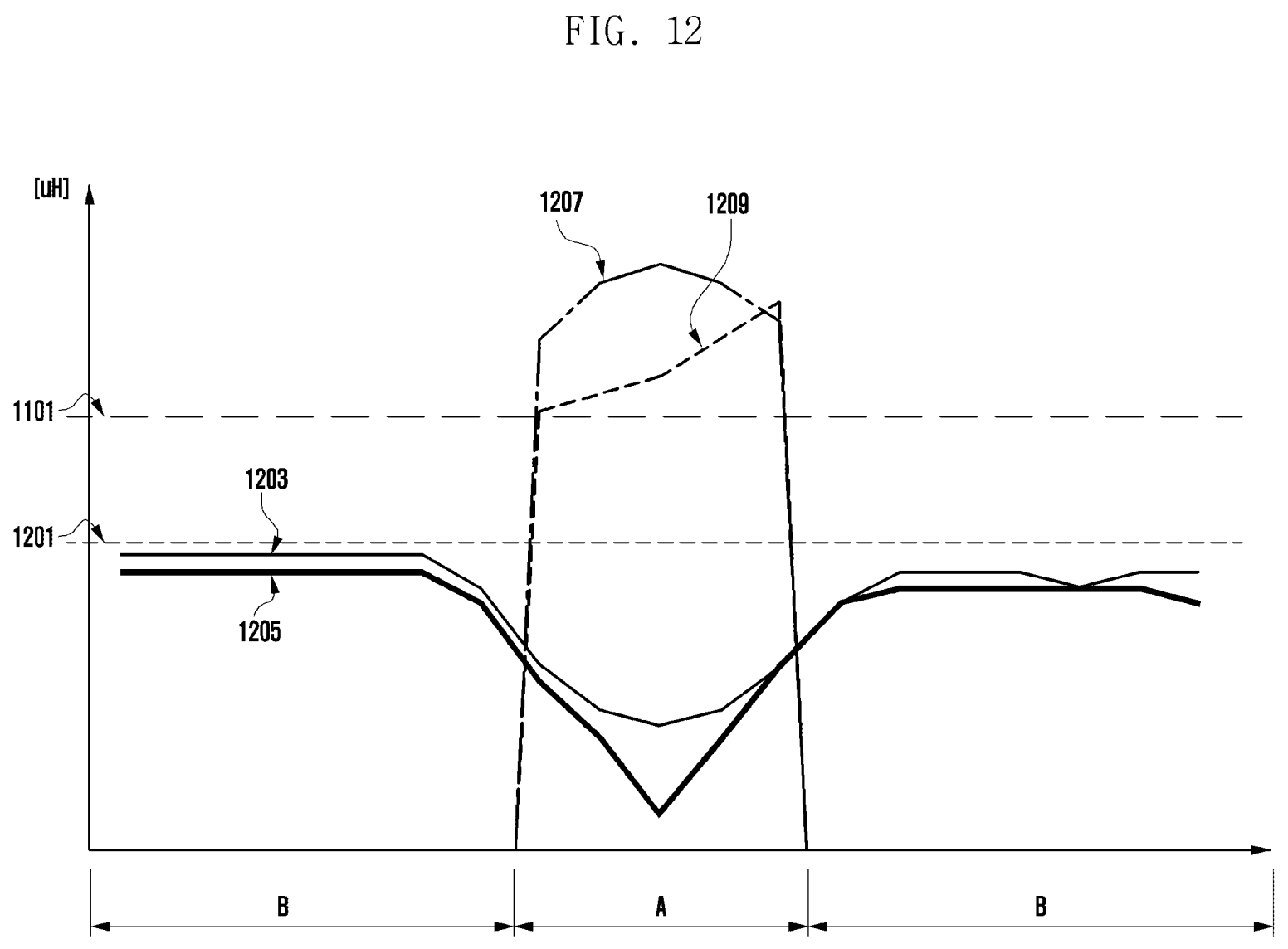

FIG. 12 is a graph illustrating inductance measured at both ends of a WPT coil according to the existence and position of a foreign object according to various embodiments.

In FIG. 11, when the foreign object is positioned in the surrounding area B, the inductance at both ends of the WPT coil may approach the first inductance 1101. FIG. 12 shows a case in which an electronic device 101 (e.g., the power transmission device 203 of FIG. 2 and FIG. 3B) measures inductance at both ends of the WPT coil using a second ping signal having a higher frequency than that of a first ping signal to measure the inductance at both ends of the WPT coil. As a frequency band increases, the inductance at both ends of the WPT coil may decrease.

When the foreign object exists between a transmission coil 321L (e.g., a WPT coil) and a reception coil 311L (e.g., a WPT coil), the electronic device 101 (e.g., the power transmission device 203 of FIG. 2 and FIG. 3B) may determine the existence and position of the foreign object, based on the first inductance 1101 and second inductance 1201. The second inductance 1201 may have a smaller inductance value than the first inductance 1101.

Graph 1203 and graph 1205 illustrate inductance at both ends of the WPT coil when the foreign object exists between the transmission coil 321L (e.g., the WPT coil) and reception coil 311L (e.g., the WPT coil).

Graph 1207 and graph 1209 illustrate inductance at both ends of the WPT coil when there is no foreign object between the transmission coil 321L (e.g., the WPT coil) and the reception coil 311L (e.g., the WPT coil).

Referring to graph 1203 and graph 1205, when the foreign object is positioned in a central area A and a surrounding area B of the transmission coil 321L (e.g., the WPT coil) and reception coil 311L (e.g., the WPT coil), the inductance measured at both ends of the WPT coil may be less than the first inductance 1101 and the second inductance 1201. When the inductance measured at both ends of the WPT coil is less than the first inductance 1101 and the second inductance 1201, the electronic device 101 (e.g., the power transmission device 203 of FIG. 2 and FIG. 3B) may determine that the foreign object exists.

In an embodiment, an electronic device 101 (e.g., the power transmission device 203 of FIG. 2 and FIG. 3B) capable of transmitting and receiving wireless power may include: a wireless power transfer (WPT) coil; and a processor 120 (e.g., the processor 322 of FIG. 3B) operatively connected to the WPT coil (e.g., the transmission coil 321L), wherein the processor 120 (e.g., the processor 322 of FIG. 3B) may perform control to transmit a first ping signal to an external object through the WPT coil (e.g., the transmission coil 321L), may identify a waveform of a current or voltage measured while or after transmitting the first ping signal, may obtain a Q factor, based on the identified waveform, may control a power transmission operation by determining that the external object is a foreign object or includes the foreign object and is positioned on a center of the WPT coil (e.g., the transmission coil 321L) when the obtained Q factor is less than a predetermined Q factor, may transmit a second ping signal to the external object through the WPT coil (e.g., the transmission coil 321L) when the obtained Q factor is equal to or greater than the predetermined Q factor, may identify a waveform of a current or voltage while or after transmitting the second ping signal, may identify inductance measured at both ends of the WPT coil (e.g., the transmission coil 321L), based on the identified waveform, and may control the power transmission operation by determining that the external object is the foreign object or includes the foreign object and is positioned in a surrounding area of the WPT coil (e.g., the transmission coil 321L), based on the measured inductance.

In an embodiment, the processor 120 (e.g., the processor 322 of FIG. 3B) may perform control to maintain the power transmission operation by determining that the external object is not the foreign object or does not include the foreign object when the measured inductance is equal to or greater than a predetermined inductance.

In an embodiment, the second ping signal may have a higher frequency band than the first ping signal.

In an embodiment, the processor 120 (e.g., the processor 322 of FIG. 3B) may estimate that the external object is positioned in the surrounding area of the WPT coil (e.g., the transmission coil 321L) when the obtained Q factor is equal to or greater than the predetermined Q factor, may measure first inductance measured at both ends of the WPT coil (e.g., the transmission coil 321L), based on the second ping signal, and may control the power transmission operation by determining that the external object includes the foreign object or is the foreign object and is positioned in the surrounding area the WPT coil (e.g., the transmission coil 321L) when the measured first inductance is less than a first predetermined inductance.

In an embodiment, the processor 120 (e.g., the processor 322 of FIG. 3B) may control the power transmission operation by determining that the external object includes the foreign object or is the foreign object and is positioned on the center of the WPT coil (e.g., the transmission coil 321L) when the obtained Q factor is less than the predetermined Q factor.

In an embodiment, the processor 120 (e.g., the processor 322 of FIG. 3B) may perform a ping operation when determining that power loss is equal to or greater than a predetermined value during the power transmission operation with an external electronic device 101 (e.g., the power transmission device 203 of FIG. 2 and FIG. 3B), may maintain display of a user interface relating to charging while performing the ping operation, and may control a fast charging operation to a normal charging operation when the power transmission operation is the fast charging operation.

An electronic device 101 (e.g., the power transmission device 203 of FIG. 2 and FIG. 3B) capable of transmitting and receiving wireless power may include: a wireless power transfer (WPT) coil; and a processor 120 (e.g., the processor 322 of FIG. 3B) operatively connected to the WPT coil (e.g., the transmission coil 321L), wherein the processor 322 of FIG. 3B may transmit a first ping signal to an external object through the WPT coil (e.g., the transmission coil 321L), may identify a waveform of a current or voltage while or after transmitting the first ping signal, may obtain a Q factor, based on the identified waveform, may measure inductance at both ends of the WPT coil (e.g., the transmission coil 321L), based on the identified waveform, and may control a power transmission operation by determining that the external object is a foreign object or includes the foreign object and is positioned in a surrounding area of the WPT coil (e.g., the transmission coil 321L) when the obtained Q factor is equal to or greater than a predetermined Q factor and the measured inductance is less than a predetermined inductance.

In an embodiment, the processor 120 (e.g., the processor 322 of FIG. 3B) may control the power transmission operation by determining that the external object is not the foreign object or does not include the foreign object and is positioned in the surrounding area of the WPT coil (e.g., the transmission coil 321L) when the obtained Q factor is equal to or greater than the predetermined Q factor and the measured inductance is equal to or greater than the predetermined inductance.

In an embodiment, the processor 120 (e.g., the processor 322 of FIG. 3B) may control the power transmission operation by determining that the external object is the foreign object or includes the foreign object and is positioned on a center of the WPT coil (e.g., the transmission coil 321L) when the obtained Q factor is less than the predetermined Q factor.

In an embodiment, the processor 120 (e.g., the processor 322 of FIG. 3B) may control the power transmission operation by determining that the external object is the foreign object or includes the foreign object and is positioned in the surrounding 5 area of the WPT coil (e.g., the transmission coil 321L) when the measured inductance is less than the predetermined inductance.

In an embodiment, a foreign object detection method of an electronic device 101 (e.g., the power transmission device 203 of FIG. 2 and FIG. 3B) capable of transmitting and receiving wireless power using a wireless power transfer (WPT) coil may include: transmitting a first ping signal to an external object through the WPT coil (e.g., the transmission coil 321L); identifying a waveform of a current or voltage measured while or after transmitting the first ping signal; obtaining a Q factor, based on the identified waveform; controlling a power transmission operation by determining that the external object is a foreign object or includes the foreign object and is positioned on a center of the WPT coil (e.g., the transmission coil 321L) when the obtained Q factor is less than a predetermined Q factor; transmitting a second ping signal to the external object through the WPT coil (e.g., the transmission coil 321L) when the obtained Q factor is equal to or greater than the predetermined Q factor; identifying a waveform of a current or voltage while or after transmitting the second ping signal; identifying inductance measured at both ends of the WPT coil (e.g., the transmission coil 321L), based on the identified waveform; and controlling the power transmission operation by determining that the external object is the foreign object or includes the foreign object and is positioned in a surrounding area of the WPT coil (e.g., the transmission coil 321L), based on measured inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include performing control to maintain the power transmission operation by determining that the external object is not the foreign object or does not include the foreign object when the measured inductance is equal to or greater than a predetermined inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include: determining that the external object is positioned in the surrounding area of the WPT coil (e.g., the transmission coil 321L) when the obtained Q factor is equal to or greater than the predetermined Q factor; measuring first inductance measured at both ends of the WPT coil (e.g., the transmission coil 321L), based on the second ping signal; and controlling the power transmission operation by determining that the external object includes the foreign object or is the foreign object and is positioned in the surrounding area the WPT coil (e.g., the transmission coil 321L) when the measured first inductance is less than a first predetermined inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include: determining that the external object is positioned on the center of the WPT coil (e.g., the transmission coil 321L) when the obtained Q factor is less than the predetermined Q factor; measuring second inductance measured at both ends of the WPT coil (e.g., the transmission coil 321L), based on the first ping signal; and controlling the power transmission operation by determining that the external object includes the foreign object or is the foreign object and is positioned on the center of the WPT coil (e.g., the transmission coil 321L) when the measured second inductance is less than a second predetermined inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include: performing a ping operation when determining that power loss is equal to or greater than a predetermined value during the power transmission operation with an external electronic device 101 (e.g., the power transmission device 203 of FIG. 2 and FIG. 3B); maintaining display of a user interface relating to charging while performing the ping operation; and controlling a fast charging operation to a normal charging operation when the power transmission operation is the fast charging operation.

In an embodiment, a foreign object detection method of an electronic device 101 (e.g., the power transmission device 203 of FIG. 2 and FIG. 3B) capable of transmitting and receiving wireless power using a wireless power transfer (WPT) coil may include: transmitting a first ping signal to an external object through the WPT coil (e.g., the transmission coil 321L); identifying a waveform of a current or voltage while or after transmitting the first ping signal; obtaining a Q factor, based on the identified waveform; measuring inductance at both ends of the WPT coil (e.g., the transmission coil 321L), based on the identified waveform; and controlling a power transmission operation by determining that the external object is a foreign object or includes the foreign object and is positioned in a surrounding area of the WPT coil (e.g., the transmission coil 321L) when the obtained Q factor is equal to or greater than a predetermined Q factor and the measured inductance is less than a predetermined inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include controlling the power transmission operation by determining that the external object is not the foreign object or does not include the foreign object and is positioned in the surrounding area of the WPT coil (e.g., the transmission coil 321L) when the obtained Q factor is equal to or greater than the predetermined Q factor and the measured inductance is equal to or greater than the predetermined inductance.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include controlling the power transmission operation by determining that the external object is the foreign object or includes the foreign object and is positioned on a center of the WPT coil (e.g., the transmission coil 321L) when the obtained Q factor is less than the predetermined Q factor.

In an embodiment, the foreign object detection method of the electronic device 101 (e.g., the power transmission device 203 of FIG. 2 and FIG. 3B) capable of transmitting and receiving wireless power using the wireless power transfer (WPT) coil may include controlling the power transmission operation by determining that the external object is the foreign object or includes the foreign object and is positioned in the surrounding area of the WPT coil (e.g., the transmission coil 321L) when the obtained Q factor is less than the predetermined Q factor and the measured inductance is less than the predetermined inductance.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and do not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium which may, for example, refer to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device capable of transmitting and receiving wireless power, the electronic device comprising:
   a wireless power transfer (WPT) coil; and
   a processor configured to be operatively connected to the WPT coil,
   wherein the processor is configured to:
      perform control to transmit a first ping signal to an external object through the WPT coil;
      identify a waveform of a current or voltage measured while or after transmitting the first ping signal;
      obtain a Q factor, based on the identified waveform;
      control a power transmission operation by determining that the external object is a foreign object or comprises the foreign object and is positioned on a center of the WPT coil based on the obtained Q factor being less than a predetermined Q factor;

transmit a second ping signal to the external object through the WPT coil based on the obtained Q factor being equal to or greater than the predetermined Q factor;

identify a waveform of a current or voltage while or after transmitting the second ping signal;

identify inductance measured at both ends of the WPT coil, based on the identified waveform; and control the power transmission operation by determining that the external object is the foreign object or comprises the foreign object and is positioned in a surrounding area of the WPT coil, based on the measured inductance.

2. The electronic device of claim 1, wherein the processor is configured to perform control to maintain the power transmission operation by determining that the external object is not the foreign object or does not comprise the foreign object based on the measured inductance being equal to or greater than a predetermined inductance.

3. The electronic device of claim 1, wherein the second ping signal has a higher frequency than the first ping signal.

4. The electronic device of claim 1, wherein the processor is configured to:

estimate that the external object is positioned in the surrounding area of the WPT coil based on the obtained Q factor being equal to or greater than the predetermined Q factor;

measure first inductance measured at both ends of the WPT coil, based on the second ping signal; and control the power transmission operation by determining that the external object comprises the foreign object or is the foreign object and is positioned in the surrounding area the WPT coil based on the measured first inductance being less than a first predetermined inductance.

5. The electronic device of claim 1, wherein the processor is configured to control the power transmission operation by determining that the external object comprises the foreign object or is the foreign object and is positioned on the center of the WPT coil based on the obtained Q factor being less than the predetermined Q factor.

6. The electronic device of claim 1, wherein the processor is configured to:

perform a ping operation based on determining that power loss is equal to or greater than a predetermined value during the power transmission operation with an external electronic device;

maintain display of a user interface relating to charging while performing the ping operation; and control a fast charging operation to a normal charging operation based on the power transmission operation being the fast charging operation.

7. An electronic device capable of transmitting and receiving wireless power, the electronic device comprising:

a wireless power transfer (WPT) coil; and a processor configured to be operatively connected to the WPT coil, wherein the processor is configured to:

transmit a first ping signal to an external object through the WPT coil;

identify a waveform of a current or voltage while or after transmitting the first ping signal, obtain a Q factor, based on the identified waveform;

measure inductance at both ends of the WPT coil, based on the identified waveform; and control a power transmission operation by determining that the external object is a foreign object or comprises the foreign object and is positioned in a surrounding area of the WPT coil based on the obtained Q factor being equal to or greater than a predetermined Q factor and the measured inductance being less than a predetermined inductance.

8. The electronic device of claim 7, wherein the processor is configured to control the power transmission operation by determining that the external object is not the foreign object or does not comprise the foreign object and is positioned in the surrounding area of the WPT coil based on the obtained Q factor being equal to or greater than the predetermined Q factor and the measured inductance being equal to or greater than the predetermined inductance.

9. The electronic device of claim 7, wherein the processor is configured to control the power transmission operation by determining that the external object is the foreign object or comprises the foreign object and is positioned on a center of the WPT coil based on the obtained Q factor being less than the predetermined Q factor.

10. The electronic device of claim 7, wherein the processor is configured to control the power transmission operation by determining that the external object is the foreign object or comprises the foreign object and is positioned in the surrounding area of the WPT coil based on the measured inductance being less than the predetermined inductance.

11. A foreign object detection method of an electronic device capable of transmitting and receiving wireless power using a wireless power transfer (WPT) coil, the method comprising:

transmitting a first ping signal to an external object through the WPT coil;

identifying a waveform of a current or voltage measured while or after transmitting the first ping signal;

obtaining a Q factor, based on the identified waveform;

controlling a power transmission operation by determining that the external object is a foreign object or comprises the foreign object and is positioned on a center of the WPT coil based on the obtained Q factor being less than a predetermined Q factor;

transmitting a second ping signal to the external object through the WPT coil based on the obtained Q factor being equal to or greater than the predetermined Q factor;

identifying a waveform of a current or voltage while or after transmitting the second ping signal;

identifying inductance measured at both ends of the WPT coil, based on the identified waveform; and controlling the power transmission operation by determining that the external object is the foreign object or comprises the foreign object and is positioned in a surrounding area of the WPT coil, based on the measured inductance.

12. The method of claim 11, further comprising performing control to maintain the power transmission operation by determining that the external object is not the foreign object or does not comprise the foreign object based on the measured inductance being equal to or greater than a predetermined inductance.

13. The method of claim 11, wherein the second ping signal has a higher frequency than the first ping signal.

14. The method of claim 11, further comprising:

determining that the external object is positioned in the surrounding area of the WPT coil based on the obtained Q factor being equal to or greater than the predetermined Q factor;

measuring first inductance measured at both ends of the WPT coil, based on the second ping signal; and controlling the power transmission operation by determining that the external object comprises the foreign object or is the foreign object and is positioned in the surrounding area the WPT coil based on the measured first inductance being less than a first predetermined inductance.

15. The method of claim 11, further comprising:

determining that the external object is positioned on the center of the WPT coil based on the obtained Q factor being less than the predetermined Q factor;

measuring second inductance measured at both ends of the WPT coil, based on the first ping signal; and controlling the power transmission operation by determining that the external object comprises the foreign object or is the foreign object and is positioned on the center of the WPT coil based on the measured second inductance being less than a second predetermined inductance.

16. The method of claim 11, further comprising:

performing a ping operation based on determining that power loss is equal to or greater than a predetermined value during the power transmission operation with an external electronic device;

maintaining display of a user interface relating to charging while performing the ping operation; and controlling a fast charging operation to a normal charging operation based on the power transmission operation being the fast charging operation.

17. A foreign object detection method of an electronic device capable of transmitting and receiving wireless power using a wireless power transfer (WPT) coil, the method comprising:

transmitting a first ping signal to an external object through the WPT coil;

identifying a waveform of a current or voltage while or after transmitting the first ping signal;

obtaining a Q factor, based on the identified waveform;

measuring inductance at both ends of the WPT coil, based on the identified waveform; and controlling a power transmission operation by determining that the external object is a foreign object or comprises the foreign object and is positioned in a surrounding area of the WPT coil based on the obtained Q factor being equal to or greater than a predetermined Q factor and the measured inductance being less than a predetermined inductance.

18. The method of claim 17, further comprising controlling the power transmission operation by determining that the external object is not the foreign object or does not comprise the foreign object and is positioned in the surrounding area of the WPT coil in case that the obtained Q factor is equal to or greater than the predetermined Q factor and the measured inductance is equal to or greater than the predetermined inductance.

19. The method of claim 17, further comprising controlling the power transmission operation by determining that the external object is the foreign object or comprises the foreign object and is positioned on a center of the WPT coil based on the obtained Q factor being less than the predetermined Q factor.

20. The method of claim 19, further comprising controlling the power transmission operation by determining that the external object is the foreign object or comprises the foreign object and is positioned in the surrounding area of the WPT coil based on the obtained Q factor being less than the predetermined Q factor and the measured inductance being less than the predetermined inductance.

* * * * *